(12) United States Patent
Gibson

(10) Patent No.: US 9,096,249 B2
(45) Date of Patent: Aug. 4, 2015

(54) LOAD CARRIER WITH MODE CHANGER

(71) Applicant: Ameriwood Industries, Inc., Wright City, MO (US)

(72) Inventor: William R Gibson, Kent, OH (US)

(73) Assignee: Ameriwood Industries, Inc., Wright City, MO (US)

( * ) Notice: Subject to any disclaimer, the term of this patent is extended or adjusted under 35 U.S.C. 154(b) by 0 days.

(21) Appl. No.: 14/330,890

(22) Filed: Jul. 14, 2014

(65) Prior Publication Data

US 2015/0014965 A1 Jan. 15, 2015

Related U.S. Application Data

(60) Provisional application No. 61/845,648, filed on Jul. 12, 2013.

(51) Int. Cl.
*B62B 1/00* (2006.01)
*B62B 3/02* (2006.01)

(52) U.S. Cl.
CPC ...................................... *B62B 3/022* (2013.01)

(58) Field of Classification Search
USPC ...................... 280/47.18, 652, 47, 2, 651, 645
See application file for complete search history.

(56) References Cited

U.S. PATENT DOCUMENTS

| | | | |
|---|---|---|---|
| 2,363,619 A | 11/1944 | Prieto | |
| 2,598,168 A | 5/1947 | Hooz et al. | |
| 2,786,692 A | 8/1954 | Timpson | |
| 3,785,669 A | 1/1974 | Doheny | |
| 3,873,118 A | 3/1975 | Takagi | |
| 4,227,709 A | 10/1980 | Gradwohl et al. | |
| 4,358,124 A | 11/1982 | Geschwender | |
| 4,561,674 A | 12/1985 | Alessio | |
| 4,659,096 A | 4/1987 | Leimgruber | |
| 4,681,330 A | 7/1987 | Misawa | |
| 4,921,270 A | 5/1990 | Schoberg | |
| 5,207,439 A | 5/1993 | Mortenson | |
| 5,476,282 A | 12/1995 | Dahl | |
| 5,536,034 A | 7/1996 | Miller | |
| 5,709,400 A | 1/1998 | Bonnier et al. | |
| 5,779,251 A | 7/1998 | Meier | |
| 5,810,373 A | 9/1998 | Miranda | |
| 6,053,514 A * | 4/2000 | Su | 280/40 |
| 6,053,515 A | 4/2000 | Kelley | |
| 6,273,438 B1 | 8/2001 | Prapavat | |
| 6,308,967 B1 | 10/2001 | Stallbaumer et al. | |
| 6,328,319 B1 | 12/2001 | Stahler, Sr. | |
| 6,364,328 B1 | 4/2002 | Stahler, Sr. | |
| 6,419,244 B2 | 7/2002 | Meabon | |
| 6,880,835 B2 | 4/2005 | Tornabene et al. | |
| 6,945,545 B2 | 9/2005 | Celli | |
| 7,168,712 B2 | 1/2007 | Celli | |

(Continued)

FOREIGN PATENT DOCUMENTS

DE   6751061 U   1/1969

OTHER PUBLICATIONS

International Search Report and Written Opinion, International Application No. PCT/US/2014/046490, Nov. 6, 2014, 8 pages.

*Primary Examiner* — John Walters
*Assistant Examiner* — James Triggs
(74) *Attorney, Agent, or Firm* — Barnes & Thornburg LLP

(57) ABSTRACT

A multi-mode load carrier is convertible to assume a storage mode, a cart mode, and a hand-truck mode. The load carrier includes a rolling base and a base pusher having a handgrip.

27 Claims, 17 Drawing Sheets

(56) References Cited

U.S. PATENT DOCUMENTS

| | | | |
|---|---|---|---|
| 7,600,765 B2 * | 10/2009 | Tsai .......................... 280/47.18 |
| 7,784,816 B2 * | 8/2010 | Jian et al. .................... 280/651 |
| 7,819,409 B2 | 10/2010 | Chang |
| 8,091,916 B2 | 1/2012 | Shapiro |
| 8,465,046 B2 | 6/2013 | Meyers et al. |
| 2003/0075887 A1 | 4/2003 | Malone, Jr. |
| 2004/0256818 A1 | 12/2004 | Amsili |

* cited by examiner

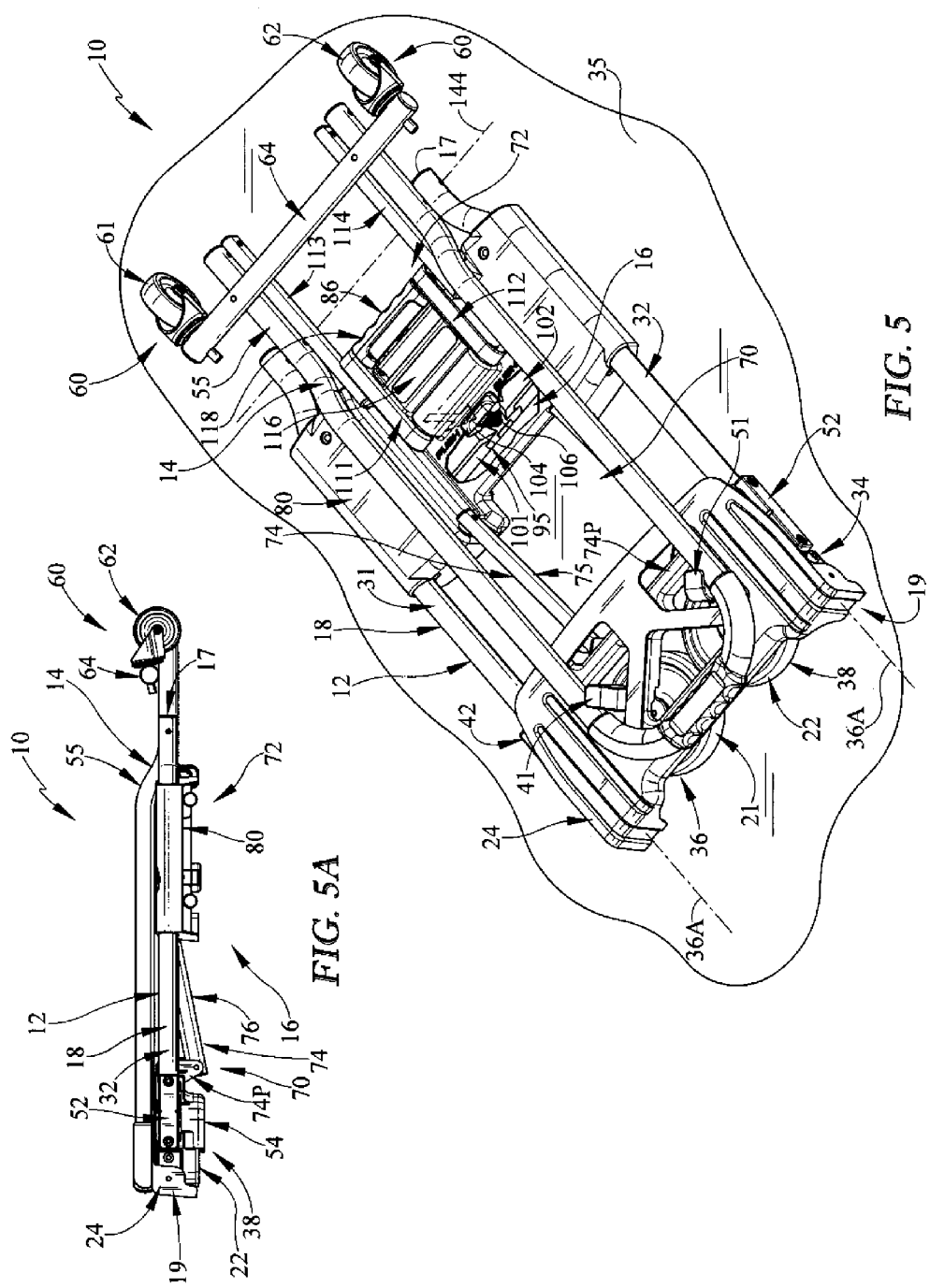

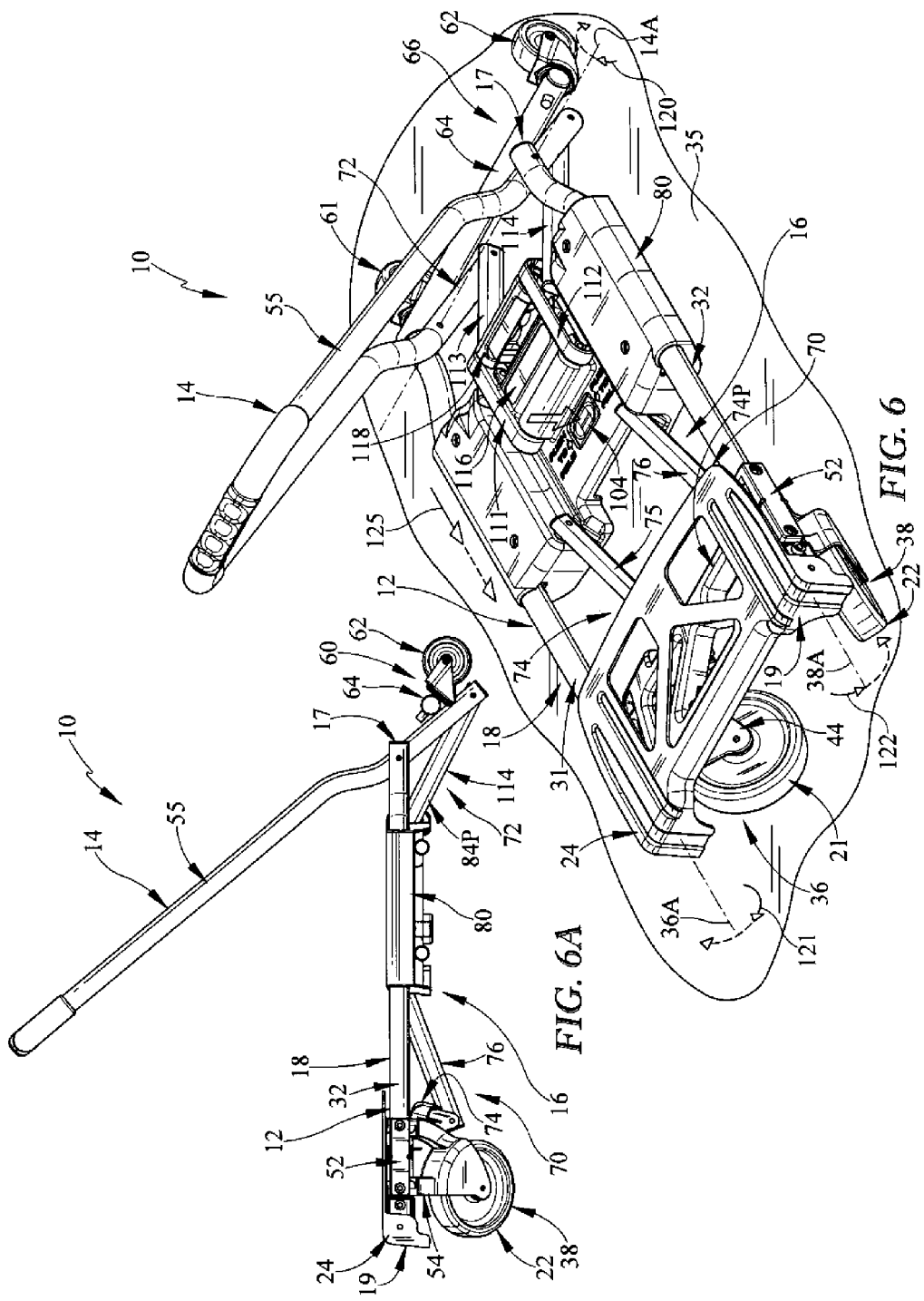

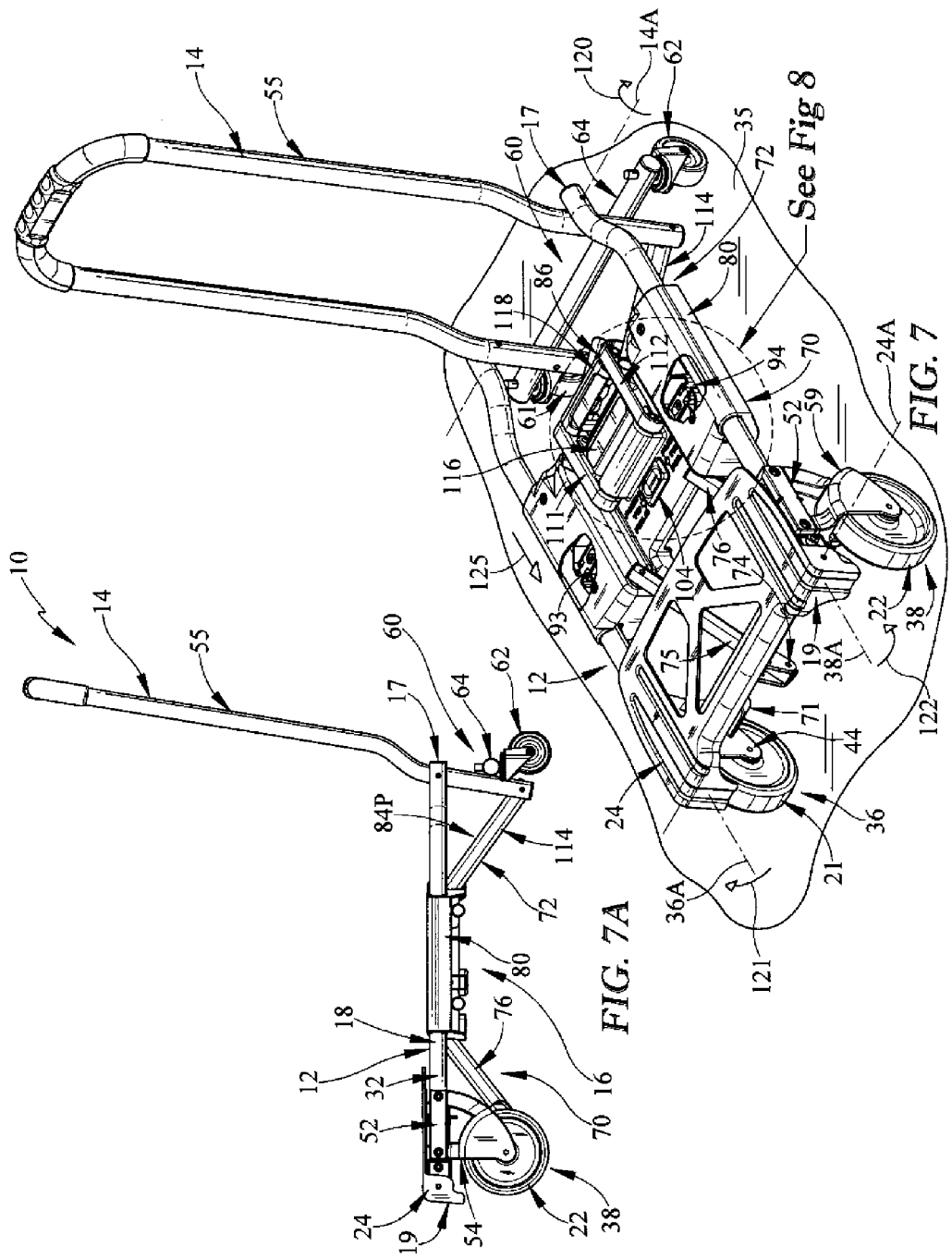

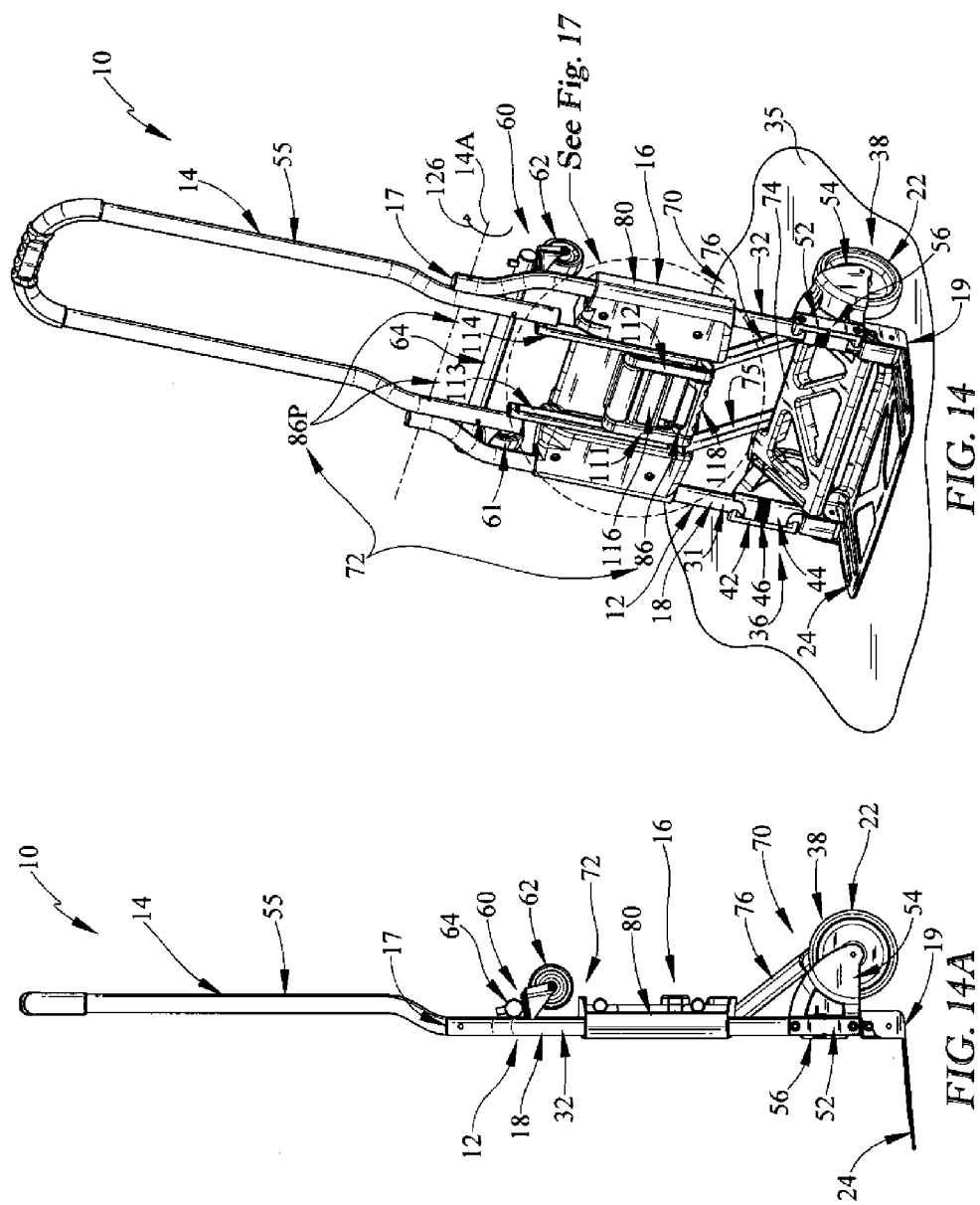

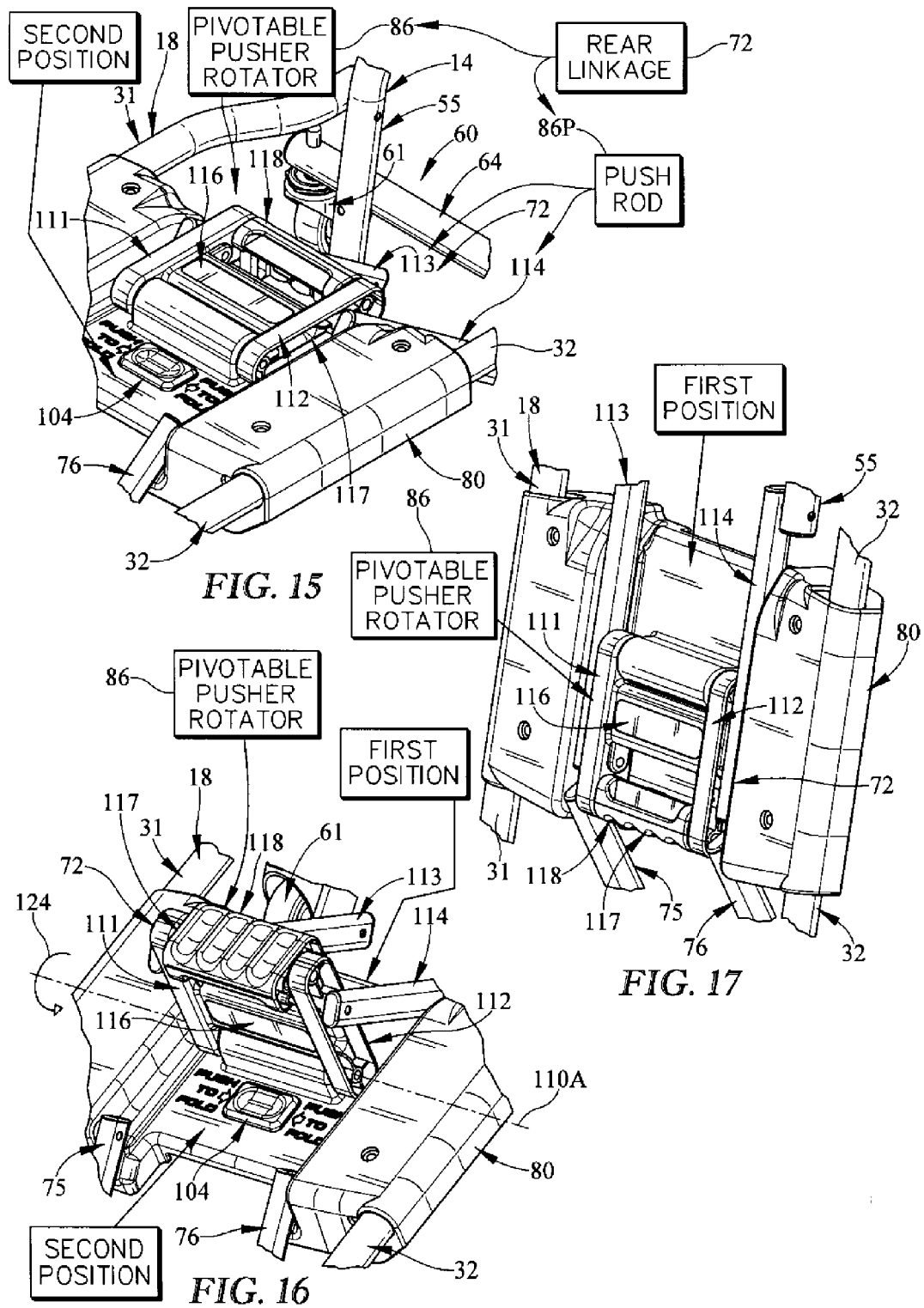

LOAD CARRIER WITH MODE CHANGER

PRIORITY CLAIM

This application claims priority under 35 U.S.C. §119(e) to U.S. Provisional Application Ser. No. 61/845,648, filed Jul. 12, 2013, which is expressly incorporated by reference herein.

BACKGROUND

The present disclosure relates to a load carrier and particularly to a load carrier with wheels that can be collapsed to assume a compact storage mode. More particularly, the present disclosure relates to a wheeled load carrier that can be reconfigured in the field by a user to function in two operating modes.

SUMMARY

According to the present disclosure, a collapsible load carrier includes a rolling base and a base pusher mounted on the rolling base for movement relative to the rolling base. In illustrative embodiments, the collapsible load carrier further includes a load-carrier mode changer coupled to the rolling base and to the base pusher. The mode changer is configured to pivot left and right front wheel units of the rolling base relative to companion wheel-support rails of the rolling base from a folded storage position to an unfolded rolling position.

In illustrative embodiments, the rolling base comprises a load-support frame including left and right wheel-support rails and the base pusher is mounted on the rails for pivotable movement relative to the load-support frame about a base-pusher pivot axis. The rolling base also includes a left front wheel unit mounted on the left wheel-support rail for pivotable movement between a folded storage position and an unfolded rolling position and a right front wheel unit mounted on the right wheel-support rail for pivotable movement between a folded storage position and an unfolded rolling position. The mode changer is coupled at a rear end to the pivotable base pusher and at a front end to the pivotable left and right front wheel units.

In illustrative embodiments, the load-carrier mode changer is coupled to the rolling base and to the base pusher and configured to provide means for converting the load carrier either to a flat storage mode, a front-and-rear-wheel cart mode, or a 2-wheel hand-truck mode at the option of a user without tools. The mode changer includes a front linkage coupled to the front wheel units and arranged to slide on the wheel-support rails of the load-support frame. The mode changer also includes a rear linkage coupled to the pivotable base pusher and to the front linkage in either a FIRST POSITION or a SECOND POSITION selected by the user. It is within the scope of the present disclosure to use a single rear wheel so that three wheels engage and roll on ground underlying the rolling base in an alternative front-and-rear-wheel cart mode of the load carrier.

In illustrative embodiments, the rolling base includes two front wheels and the base pusher includes two rear wheels. All four wheels are disengaged from ground underlying the rolling base when the load carrier is in the flat storage mode. All four wheels are arranged to engage and roll on ground underlying the rolling base when the load carrier is configured in the field by a user to assume a front-and-rear wheel cart mode. In contrast, only the two front wheels are arranged to engage and roll on the ground underlying the rolling base when the load carrier is configured in the field by the user to assume a 2-wheel hand-truck mode.

In illustrative embodiments, the base pusher can be pivoted by a user about the base-pusher pivot axis through a 180° angle to move relative to the rolling base from a stored position on top of the load-support frame of the rolling base to change the load carrier from a flat storage mode to a 2-wheel hand-truck mode. First the base pusher is pivoted in a rearward first direction through about a 90° angle to assume an upright cart position to place the rear wheel(s) on the ground while the rear linkage is in the FIRST POSITION on the front linkage to cause the front and rear linkages to move together as a unit to pivot the left and right front wheel units to the unfolded rolling positions and to place the front wheels on the ground along with the rear wheel(s) to establish the front-and-rear-wheel cart mode of the load carrier. Then the base pusher is pivoted in the same direction through another 90° angle to disengage the rear wheel(s) from the ground during movement of the rear linkage to the SECOND POSITION on the front linkage to place the base pusher in line with the top of the load-support frame of the rolling base to assume a laidback hand-truck position to establish the 2-wheel hand-truck mode of the load carrier. Thus, the load carrier can be converted in the field by a user without tools using the load-carrier mode changer to assume either a flat storage mode, a front-and-rear-wheel cart mode, or a 2-wheel hand-truck mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 4A is a diagrammatic view of the load carrier in the compact flat storage mode of FIG. 1A and showing that the front linkage of the load-carrier mode changer includes a slidable spreader driver coupled to the pivotable base pusher via the rear linkage and mounted for sliding movement on the rails included in the rolling base and a wheel spreader arranged to interconnect the slidable spreader driver and the pivotable left and right front wheel units and showing that the wheel spreader is arranged to engage a ROOT section of each front wheel unit and suggesting that the pivotable base-pusher rotator included in the rear linkage of the load-carrier mode changer is coupled to the base pusher and mounted for pivoting movement on the slidable spreader driver and arranged to lie in a FIRST POSITION on the slidable spreader driver;

FIG. 4B is a diagrammatic view similar to FIG. 4A showing that the left and right front wheel units have pivoted toward one another through an angle of about 45° owing to engagement of the wheel spreader with the CAM section of each front wheel unit in response to pivoting movement of the base pusher away from the rolling base about the base-pusher pivot axis to cause sliding movement of the slidable spreader driver on the left and right rails of the rolling base in a direction toward the front wheel units and movement of the wheel spreader on the CAM section of each front wheel unit;

FIG. 4C is a diagrammatic view similar to FIGS. 4A and 4B showing that the front wheel units have been pivoted further on the rails to assume the unfolded rolling positions in response to pivoting movement of the base pusher to assume the upright cart position and suggesting that the wheel spreader has been moved along the CAM section of each front wheel unit to engage the LOCK section of each front wheel unit to retain the front wheel units in the unfolded rolling positions;

FIG. 4D is a diagrammatic view similar to FIGS. 4A-4C showing that the base pusher has been pivoted in a rearward direction about the base-pusher pivot axis relative to the rolling base to assume a laidback hand-truck position in response to pivoting movement of the pivotable base-pusher rotator on the slidable spreader driver from the FIRST POSITION in a direction away from the base-pusher pivot axis and toward the front wheels to arrive at a SECOND POSITION;

FIG. 5 is a perspective view of an illustrative collapsible load carrier in the flat storage mode shown diagrammatically in FIG. 4A and showing the base pusher in the stored position on top of a load-support frame of the rolling base and the left and right front wheel units in their folded storage positions under a U-shaped handgrip included in the base pusher;

FIG. 5A is a reduced-size side elevation view of the load carrier of FIG. 5;

FIG. 6 is a perspective view of an illustrative collapsible load carrier in the transition mode shown diagrammatically in FIG. 4B showing pivoting movement of the left and right front wheel units to reach a midway point between the folded storage positions shown in FIG. 5 and the unfolded rolling positions shown in FIGS. 7 and 8;

FIG. 6A is a reduced-size side elevation view of the load carrier of FIG. 6;

FIG. 7 is a perspective view of an illustrative load carrier in the front-and-rear wheel cart mode shown diagrammatically in FIG. 4C in which both front wheels and both rear wheels roll along the ground underlying the load carrier and showing the base pusher in the upright cart position and the left and right front wheel units in their unfolded rolling positions;

FIG. 7A is a reduced-size side elevation view of the load carrier of FIG. 7;

FIGS. 12-14 show conversion of the load carrier of FIG. 7 from the front-and-rear-wheel cart mode to the 2-wheel hand-truck mode;

FIG. 12 is a perspective view of the load carrier of FIG. 7 after a pivotable toe-plate shelf included in the rolling base and located above the front wheels has been pivoted in a forward direction from an inactive position shown in FIG. 7 to an active position shown in FIG. 12;

FIG. 12A is a reduced-size side elevation view of the load carrier of FIG. 12;

FIG. 13 is a perspective view of the load carrier of FIG. 12 in a transition mode showing rearward pivoting movement of the base pusher about the base-pusher pivot axis to reach a midway point between the upright cart position shown in FIG. 12 and the laidback hand-truck position shown in FIG. 14 in response to operation of the pivotable pusher rotator included in the rear linkage of the load-carrier mode changer;

FIG. 13A is a reduced-size side elevation view of the load carrier of FIG. 13;

FIG. 14 is a perspective view of the load carrier of FIGS. 12 and 13 in the 2-wheel hand-truck mode shown diagrammatically in FIG. 4D and showing the left and right front wheel units in the unfolded rolling positions, the base pusher in the laidback hand-truck position, and the pivotable pusher rotator of the rear linkage of the load-carrier mode changer in the SECOND POSITION on the slidable spreader driver of the front linkage of the load-carrier mode changer;

FIG. 14A is a reduced-size elevation view of the load carrier of FIG. 14;

FIG. 15 is a detail perspective view of the rear linkage included in the load carrier of FIG. 12 showing that the pusher rotator arranged to lie in the FIRST POSITION in engagement with a first side of the slidable spreader driver to hold the slider links of the handgrip in place when the load carrier is in the cart mode until a user unlocks the spreader driver retainer so that the pusher links of the push rod can move relative to the slidable spreader driver as shown in FIG. 16;

FIG. 16 is a view similar to FIG. 15 of the rear linkage included in the load carrier of FIG. 13 showing the spreader driver retainer disengaged from the slidable spreader driver and the slider links of the handgrip pivoted relative to the slidable spreader driver as the base pusher moves from the upright cart position to the laidback hand-truck position during reconfiguration of the load carrier from the front-and-rear-wheel cart mode to the 2-wheel hand-truck mode;

FIG. 17 is a view similar to FIGS. 15 and 16 of the rear linkage included in the load carrier of FIG. 14 showing that the pusher rotator arranged to lie in a SECOND POSITION in engagement with a second side of the slidable spreader driver, opposite the first side, to hold the slider links of the handgrip in place when the load carrier is in the 2-wheel hand-truck mode;

DETAILED DESCRIPTION

Figure 1:
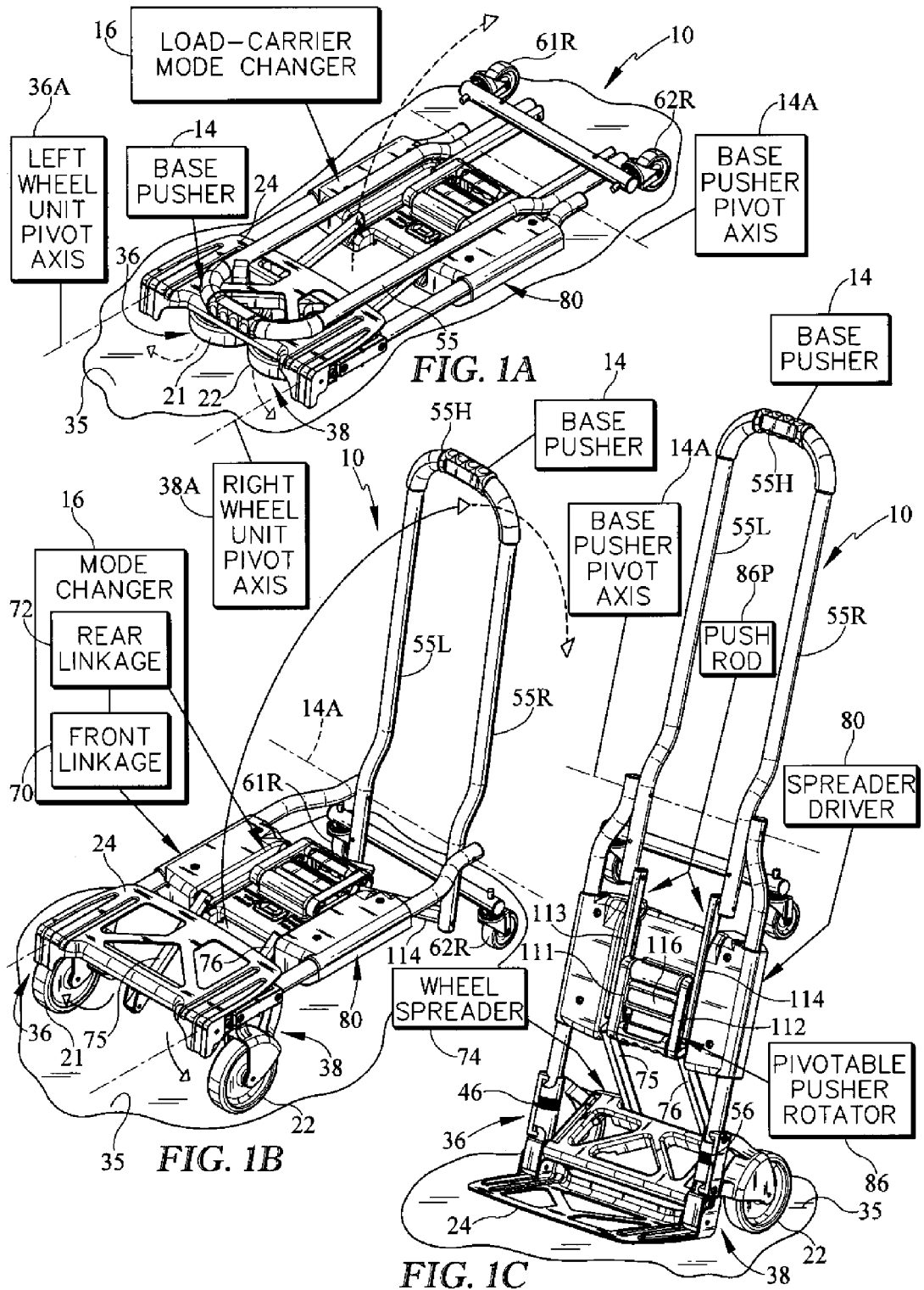
FIG. 1A is a perspective view of a collapsible load carrier in a compact flat storage mode showing that a pivotable base pusher has been pivoted about a base-pusher pivot axis to lie in a stored position on top of a rolling base and showing that two front wheels in the rolling base lie in folded storage positions under the U-shaped handgrip of the base pusher and two rear wheels included in the base pusher are arranged to lie above ground underlying the rolling base and suggesting that the load carrier also includes a load-carrier mode changer that is coupled to the pivotable base pusher and to the front wheels and can be operated by a user in the field in a manner suggested diagrammatically in FIGS. 4A-4D and illustratively in FIGS. 5-7 and 12-14 to convert the load carrier from a flat storage mode shown in FIG. 1A to a front-and-rear-wheel cart mode shown in FIG. 1B and to a 2-wheel hand-truck mode shown in FIG. 1C.
FIG. 1B is a perspective view of the load carrier of FIG. 1A after it has been reconfigured in the field by a user using the load-carrier mode changer to assume a front-and-rear-wheel cart mode in which the load carrier can roll on its two front wheels and two rear wheels by pivoting the base pusher about the base-pusher pivot axis upwardly away from the rolling base through an angle of about 90° to assume an upright cart position to cause forward sliding movement of the load-carrier mode changer on two horizontal rails included in a load-support frame of the rolling base to engage and pivot each of the front wheel units outwardly from the folded storage positions shown in FIG. 1A to the unfolded rolling positions shown in FIG. 1B and suggesting that the mode changer includes a front linkage coupled to the left and right front wheel units and a rear linkage coupled to the front linkage and to the pivotable base pusher.
FIG. 1C is a perspective view of the load carrier of FIGS. 1A and 1B after it has been reconfigured in the field using the load-carrier mode changer to assume a 2-wheel upright hand-truck mode in which the load carrier can roll only on its two front wheels by moving a pivotable pusher rotator included in the rear linkage of the load-carrier mode changer in a forward direction on a slidable spreader driver included in the front linkage of the load-carrier mode changer toward the larger-diameter front wheels from a first position to a second position to pivot the base pusher rearwardly about the base-pusher pivot axis from the upright cart position through an angle of about 90° to assume a laidback hand-truck position and suggesting that the front linkage includes a spreader driver and a wheel spreader and that the rear linkage includes a pivotable pusher rotator and a push rod.

A load carrier 10 in accordance with the present disclosure includes a rolling base 12, a pivotable base pusher 14, and a load-carrier mode changer 16 as shown in FIGS. 1A-1C. Load-carrier mode changer 16 can be operated in the field without tools by a user in a manner suggested diagrammatically in FIGS. 4A-4D and illustratively in FIGS. 5-7 and 12-14 to convert load carrier 10 from the flat storage mode shown in FIGS. 1A, 4A, and 5 to a front-and-rear-wheel cart mode shown in FIGS. 1B, 4C, and 7, and to a 2-wheel hand-truck mode shown in FIGS. 1C, 4D, and 12.

Figure 2:
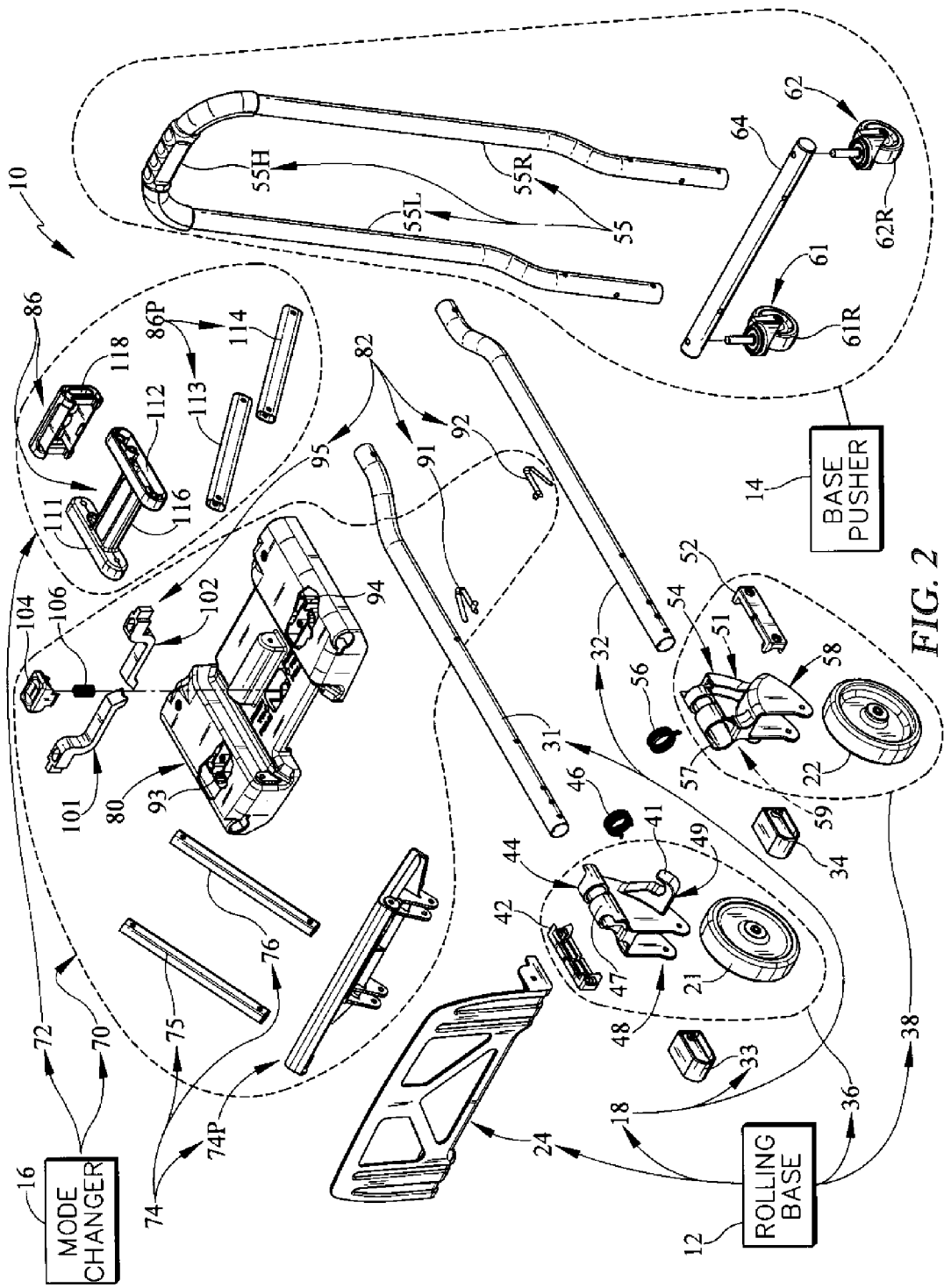
FIG. 2 is an exploded perspective view of components comprising the collapsible load carrier of FIGS. 1A-1C.
Figure 3:
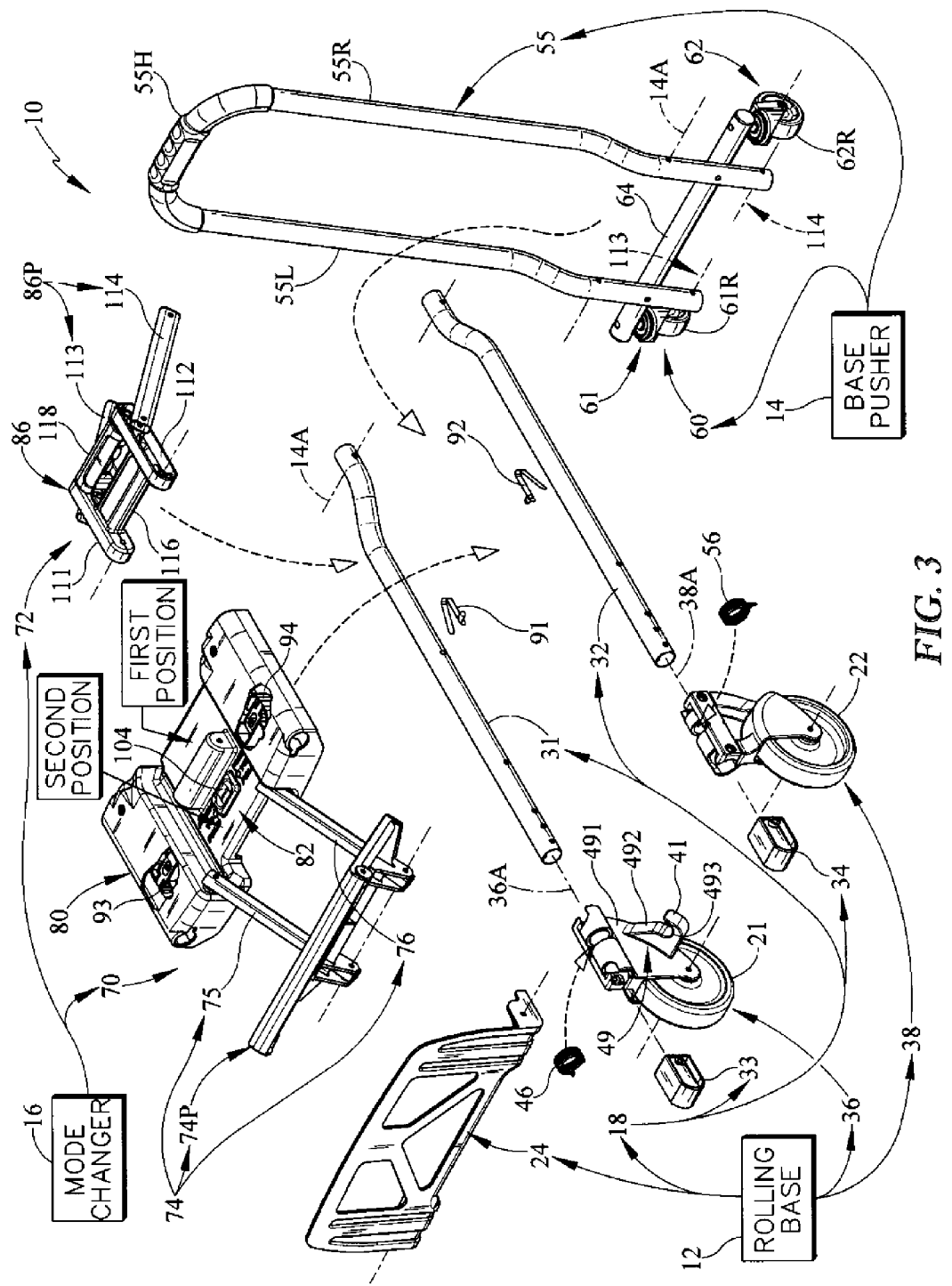
FIG. 3 is a view similar to FIG. 2 showing several load carrier subassemblies and, in particular, showing (1) a rolling base including left and right front-wheel support rails and left and right front wheel units having large-diameter front wheels and being formed to be mounted on forward ends of the front-wheel support rails for pivotable movement between folded storage positions lying in a single horizontal plane when the load carrier is in the compact flat storage mode as shown in FIG. 1A and unfolded rolling positions lying in spaced-apart parallel vertical planes when the load carrier is in the front-and-rear-wheel cart mode shown in FIG. 1B and the 2-wheel hand-truck mode shown in FIG. 1C; (2) a base pusher having small-diameter rear wheels; and (3) a load-carrier mode changer comprising a front linkage adapted to be coupled to the left and right front wheel units and formed to be mounted for back-and-forth sliding movement on the front-wheel support rails and a rear linkage adapted to be coupled to the front linkage and to the pivotable base pusher and to cooperate with the front linkage to cause the front wheel units to pivot between unfolded storage positions and folded rolling positions in response to pivoting movement of the base pusher about the base-pusher pivot axis from the stored position shown in FIG. 1A to the upright cart position shown in FIG. 1B.

Rolling base 12 includes a load-support frame 18, a left front wheel unit 36 including a left front wheel 21, and a right front wheel unit 38 including a right front wheel 22 as shown, for example, in FIGS. 2 and 3. Load-support frame 18 includes a left wheel-support rail 31, a right wheel-support rail 32, and a toe-plate shelf 24 mounted on forward ends of rails 31, 32 for pivotable movement about a shelf pivot axis 24A between an inactive flat position shown in FIGS. 1A and 1B used in the flat storage mode and the front-and-rear-wheel cart mode of load carrier 10 and an active extended position shown in FIG. 1C and used in the 2-wheel hand-truck mode of load carrier 10. Once left front wheel unit 36 is mounted on left rail 31, left front wheel unit 36 is pivotable about a left pivot axis 36A aligned with left rail 31 as suggested in FIG. 3. Once right front wheel unit 38 is mounted on right rail 32, right front wheel unit 38 is pivotable about a right pivot axis 38A aligned with right rail 32 as suggested in FIG. 3. Load-support frame 18 also includes a left end cap 33 to be mounted on a forward end of left rail 31 after left front wheel unit 36 is mounted on left rail 31 and a right end cap 34 to be mounted on a forward end of right rail 32 after right front wheel unit 38 is mounted on right rail 32.

Base pusher 14 includes a push handle 55 and an outrigger wheel unit 60 configured to be coupled to push handle 55 to move therewith as suggested, for example, in FIGS. 2 and 3. Push handle 55 includes a left leg 55L, a right leg 55R, and a U-shaped handgrip 55H interconnecting upper ends of legs 55L, 55R as suggested in FIG. 2. Outrigger wheel unit 60 includes a left caster 61 including a left rear wheel 61R, a right caster 62 including a right rear wheel 62R, and a caster-support rail 64 coupled to lower ends of left and right legs 55L, 55R of base pusher 14 and to each caster 61, 62.

Mode changer 16 includes a front linkage 70 and a rear linkage 72 as suggested in FIGS. 2 and 3. Front linkage 70 includes a spreader driver 80 and a wheel spreader 74 including a pivotable spreader plate 74P and wheel links 75, 76 interposed between and coupled to pivotable spreader plate 74P and spreader driver 80 as suggested in FIGS. 2 and 3. Front linkage 70 also includes a spreader-driver retainer 82 that is configured to block or allow sliding movement of spreader driver 80 along rails 31, 32 of load-support frame 18 at the option of a user. Rear linkage 72 includes a pivotable pusher rotator 86 and a push rod 86P including pusher links 113, 114 pivotably coupled at one end to pivotable pusher rotator 86 and at opposite ends to pivotable base pusher 14 at the lower ends of left and right legs 55L, 55R of push handle 55 below the caster-support rail 64 as suggested in FIG. 3. Pusher rotator 86 includes a movable handgrip 117 comprising pivot links 111, 112 and a crossbar 116 interconnecting pivot links 111, 112 and a handgrip-motion blocker 118 associated with crossbar 116 as suggested in FIGS. 2 and 3.

In illustrative embodiments, the mode changer 16 is operable in the field by a user without tools to convert load carrier 16 easily from its flat storage mode to a front-and-rear-wheel cart mode or an upright 2-wheel hand-truck mode. In the flat storage mode, front wheels 20, 21 are aligned to cause their treads to face toward one another and their axes of rotation to lie in spaced-apart parallel relation to one another. In the other modes, front wheels 21, 22 are aligned to cause their treads to engage and roll on ground 35 underlying rolling base 12 and to cause front wheels 21, 22 to rotate about a common axis of rotation.

Figure 4A:
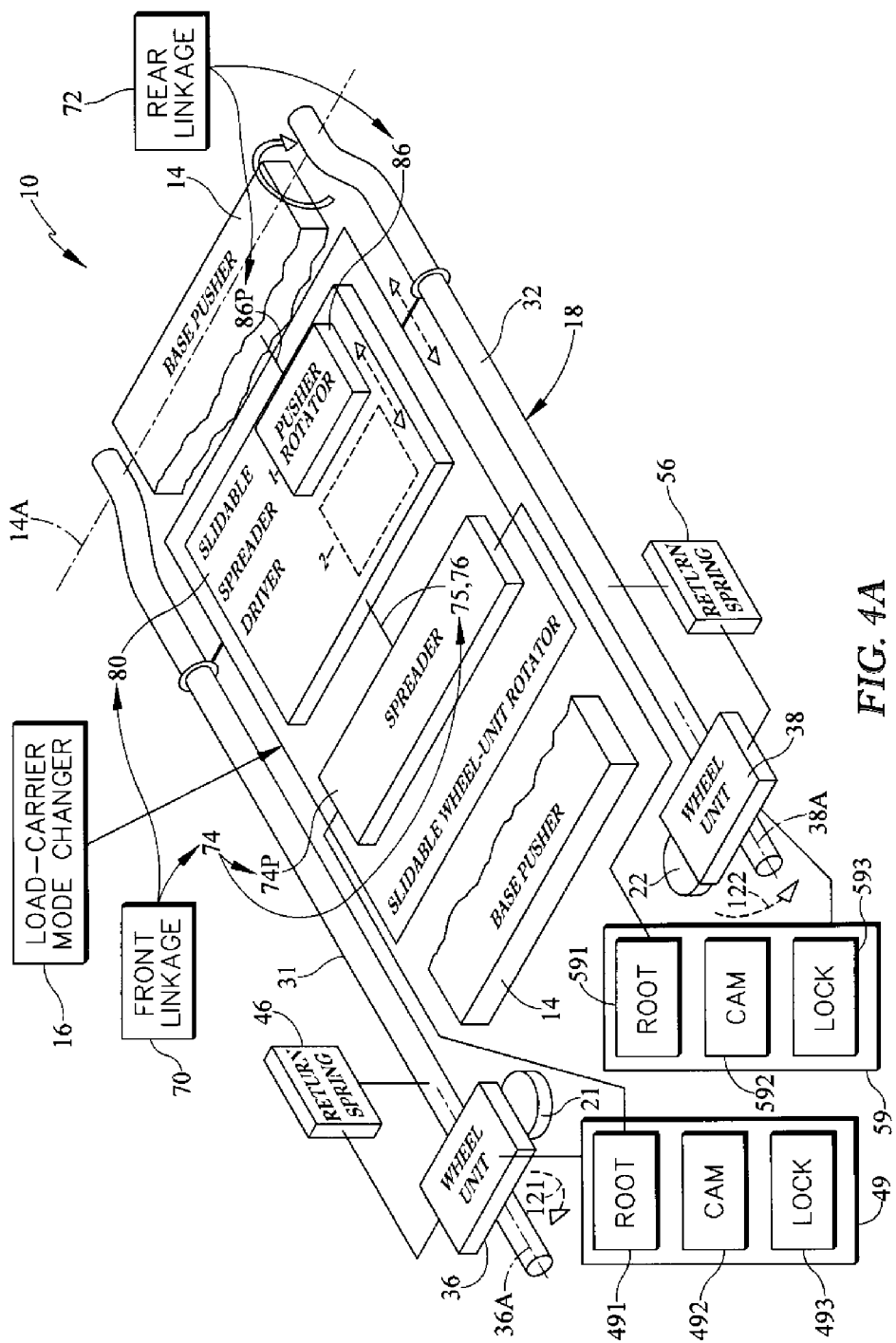
FIGS. 4A-4C are diagrammatic views showing sliding movement of the load-carrier mode changer on the left and right rails of the rolling base to cause the front wheel units to pivot from the folded storage positions to the unfolded rolling positions in response to pivoting movement of the base pusher from the stored position to the upright cart position and FIG. 4D is a diagrammatic view showing sliding movement of the pivotable pusher rotator included in the rear linkage of the load-carrier mode changer on a slidable spreader driver included in the front linkage of the load-carrier mode changer to cause the base pusher to pivot from the upright cart position suggested in FIG. 4C to the laidback hand-truck position suggested in FIG. 4D.
Figure 4B:
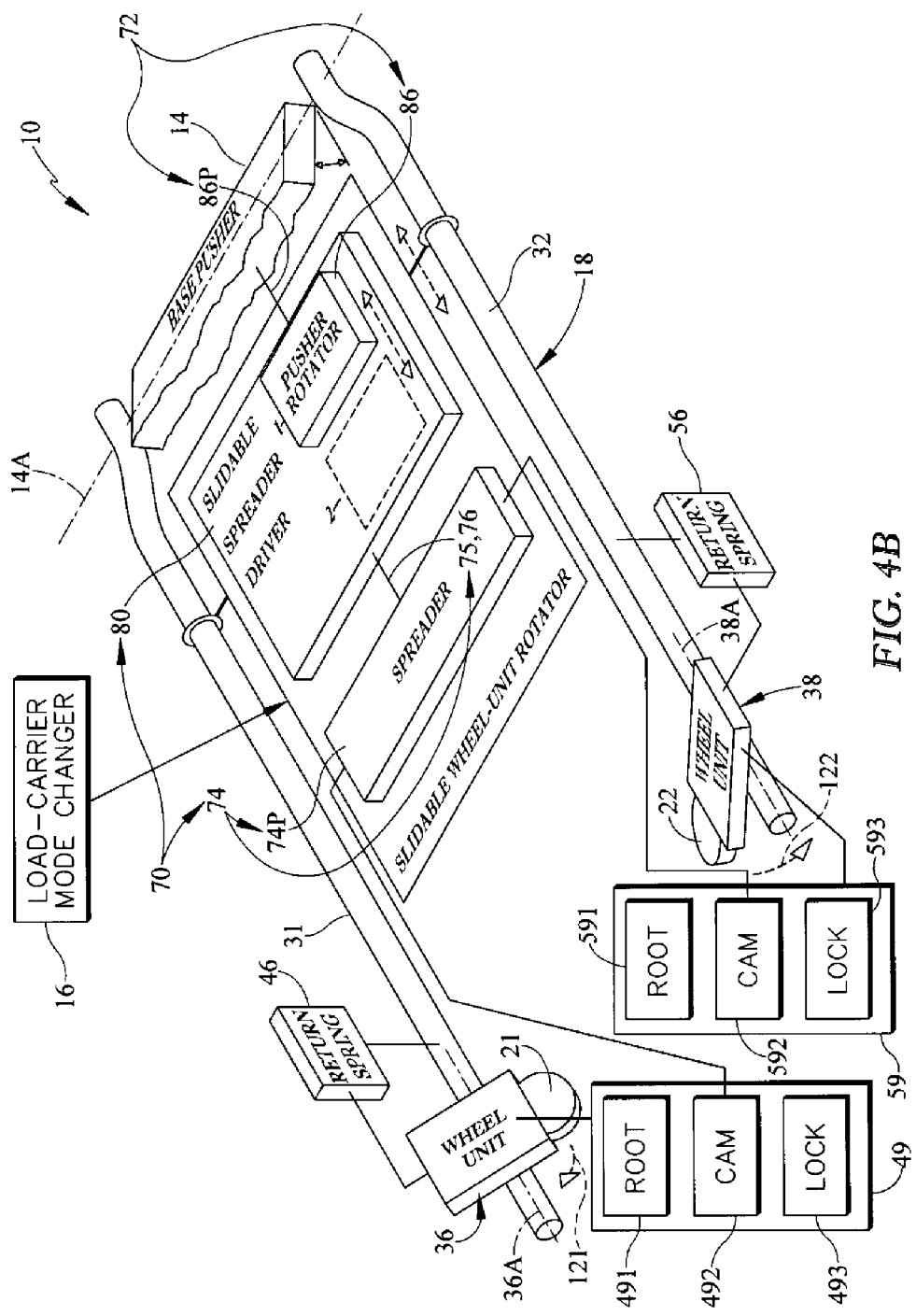
Figure 4C:
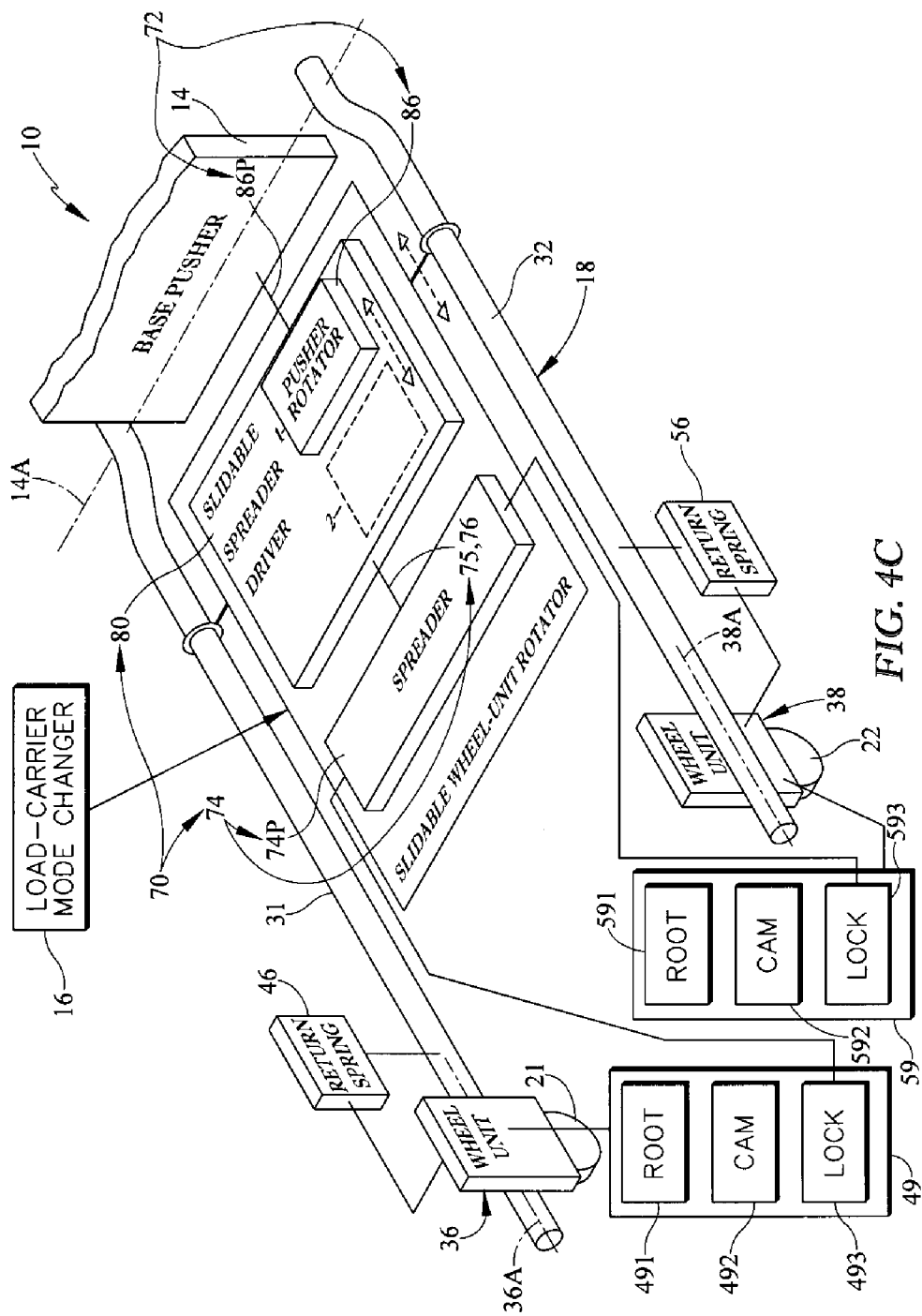
Figure 10:
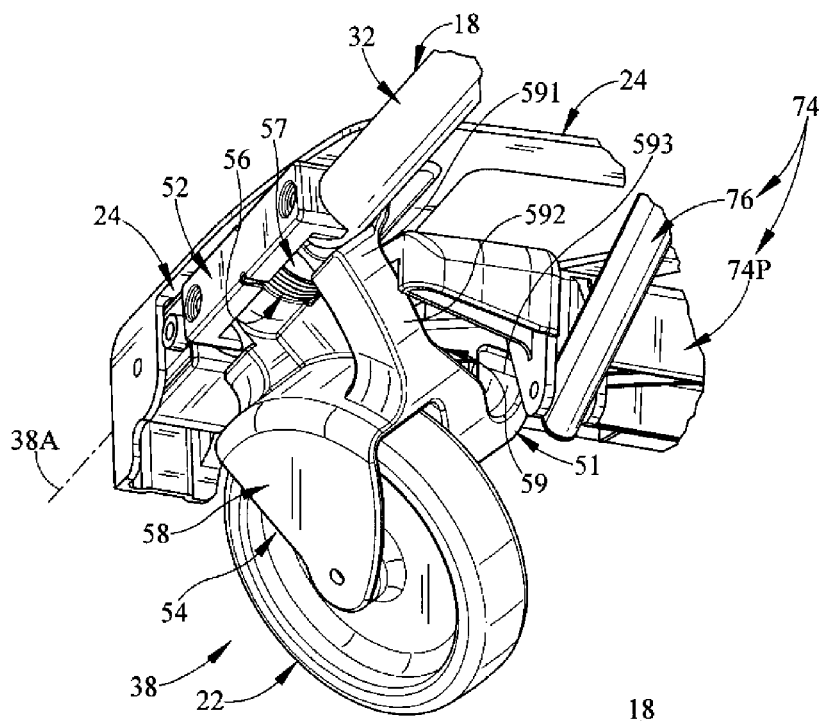
FIG. 10 is an enlarged partial perspective view of a portion of the load carrier of FIG. 6 showing engagement of the wheel spreader of the load-carrier mode changer on the CAM section of the right front wheel unit of the rolling base.
Figure 11:
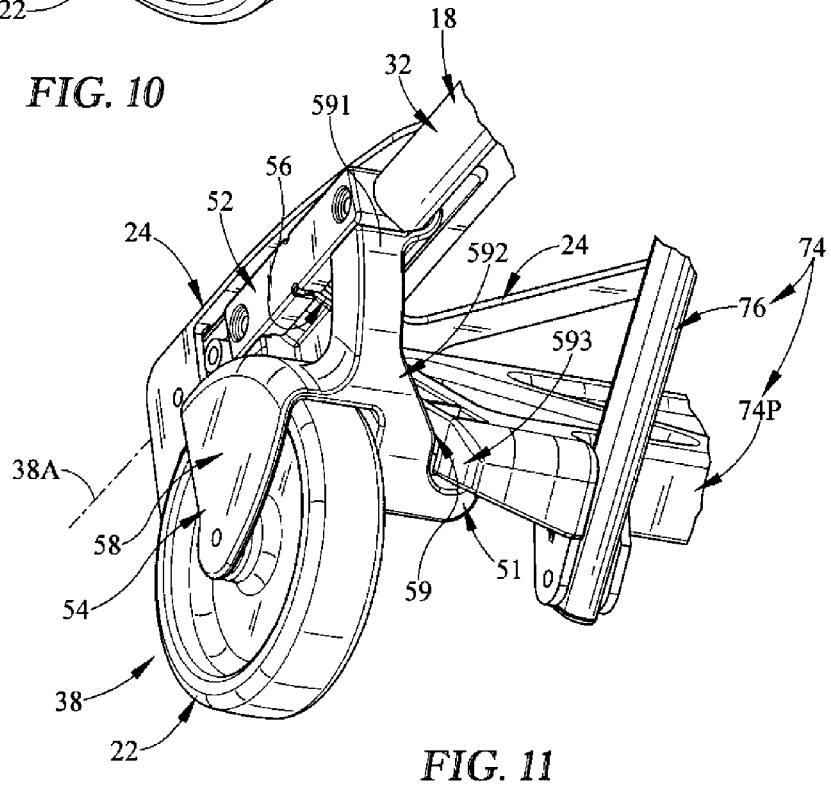
FIG. 11 is an enlarged partial perspective view of a portion of the load carrier of FIG. 7 showing engagement of the wheel spreader of the load-carrier mode changer in the LOCK (channel) section of the right front wheel unit of the rolling base and showing an angled second leg of the CAM section of the right front wheel unit that extends between a vertical first leg of the CAM section and the LOCK (channel) section.

Left front wheel unit 36 includes a cam block 49 arranged to lie alongside wheel 21 and engage a portion of spreader plate 74P of wheel spreader 74 of front linkage 70 of mode changer 16 during pivoting motion of base pusher 14 about base-pusher pivot axis 14 to change the mode of load carrier 10 from the flat storage mode to the front-and-rear-wheel cart mode as suggested diagrammatically in FIGS. 4A-4C and illustratively in FIGS. 10 and 11. Similarly, right-front wheel unit 38 includes a cam block 59 near right wheel 22. Cam block 49 includes, in sequence, a ROOT section 491, a CAM section 492, and a LOCK section 493 and cam block 59 includes, in sequence, a ROOT section 591, a CAM section 592, and a LOCK section 593. Spreader plate 74P of wheel spreader 74 engages or lies adjacent to ROOT sections 491, 591 when load carrier 10 is in the flat storage mode as suggested in FIG. 4A. Spreader plate 74P engages CAM sections 492, 592 during the movement of front linkage 70 relative to rolling base 12 that accompanies a change of load carrier 10 from the flat storage mode to the front-and-rear-wheel mode as suggested in FIGS. 4B and 4C and FIG. 10. In this circumstance, spreader plate 74P is moved toward front wheels 21, 22 to engage CAM sections 492, 592 and ride thereon in camming relation to move the companion front wheel unit 36 or 38 from the folded storage position to the unfolded rolling position and thus spread the front wheel units 36, 38 apart. Lastly, spreader plate 74P of wheel spreader 74 engages LOCK sections 493, 593 (e.g., channels) formed in a hook (41 or 51) included in cam block (49 or 59) as suggested diagrammatically in FIGS. 4C and 4D and illustratively in FIG. 11 to retain the front wheel units 36, 38 in their unfolded rolling positions.

Sliding movement of the load-carrier mode changer 16 on the left and right rails 31, 32 of the rolling base 12 to cause the front wheel units 36, 38 to pivot from the folded storage positions to the unfolded rolling positions in response to pivoting movement of the base pusher 14 from the stored position to the upright cart position is shown diagrammatically in FIGS. 4A-4C. Movement of the pivotable pusher rotator 86 included in the rear linkage 72 of the load-carrier mode changer 16 from the FIRST POSITION shown in FIG. 4C to the SECOND POSITION shown in FIG. 4D causes the base pusher 14 to pivot from the upright cart position suggested in FIG. 4C to the laidback hand-truck position suggested in FIG. 4D.

As suggested in a diagrammatic view of the load carrier 10 provided in FIG. 4A, load carrier 10 is retained in the compact flat storage mode of FIG. 1A. Front linkage 70 of the load-carrier mode changer 16 includes a slidable spreader driver 80 coupled to the base pusher 14 via the rear linkage 72 and mounted for sliding movement on the rails 31, 32 included in the rolling base 12 and a wheel spreader 74 arranged to interconnect the slidable spreader driver 80 and the pivotable left and right front wheel units 36, 38. Spreader plate 74P of wheel spreader 74 is arranged to engage a ROOT section of each front wheel unit 36, 38. Pivotable base-pusher rotator 86 included in the rear linkage 70 of the load-carrier mode changer 16 is coupled to the base pusher 14 and mounted for pivoting movement on the slidable spreader driver 80 and arranged to lie in a FIRST POSITION on the slidable spreader driver 80.

FIG. 4B is a diagrammatic view similar to FIG. 4A showing that the left and right front wheel units 36, 38 have pivoted toward one another in directions 121, 122 through an angle of about 45° owing to engagement of spreader plate 74P of wheel spreader 74 with the CAM section of each front wheel unit 36, 38 in response to pivoting movement of the base pusher 14 away from the rolling base 12 about the base-pusher pivot axis 14A to cause sliding movement of the slidable spreader driver 80 on the left and right rails 31, 32 of the rolling base 12 in a direction toward the front wheel units 36, 38 and movement of spreader plate 74P of wheel spreader 74 on the CAM section of each front wheel unit 36, 38.

FIG. 4C is a diagrammatic view showing that the front wheel units 36, 38 have been pivoted further on the rails 31, 32 to assume the unfolded rolling positions in response to pivoting movement of the base pusher 14 to assume the upright cart position and suggesting that spreader plate 74P of wheel spreader 74 has been moved along the CAM section of each front wheel unit 36, 38 to engage the LOCK section of each front wheel unit 36, 38 to retain the front wheel units 36, 38 in the unfolded rolling positions.

Figure 4D:
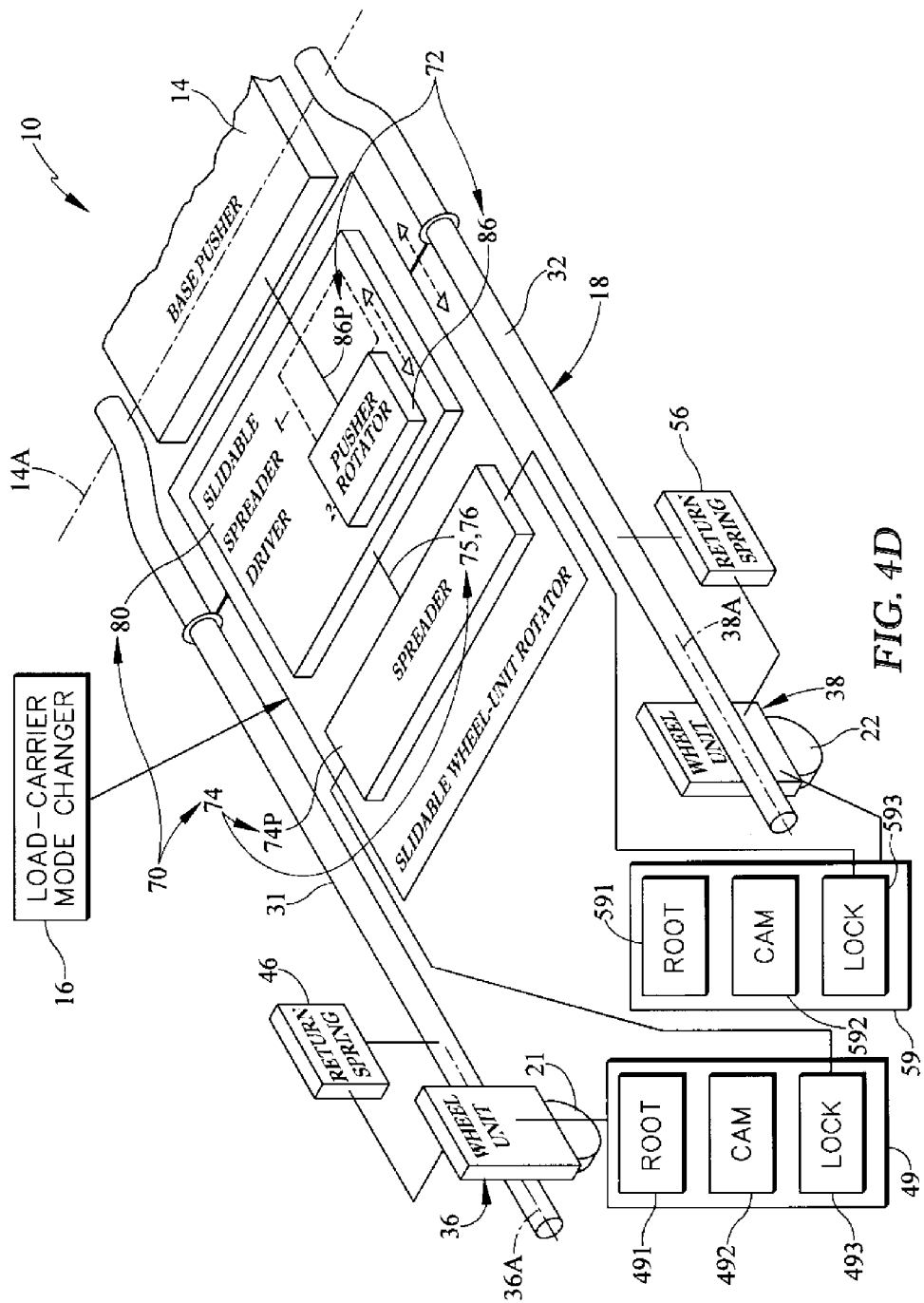

FIG. 4D is a diagrammatic view showing that the base pusher 14 has been pivoted in a rearward direction about the base-pusher pivot axis 14A relative to the rolling base 12 to assume a laidback hand-truck position in response to pivoting movement of the pivotable base-pusher rotator 86 on the slidable spreader driver 80 from the FIRST POSITION in a direction away from the base-pusher pivot axis 14A and toward the front wheels 21, 22 to arrive at a SECOND POSITION.

In illustrative embodiments, rolling base 12 comprises a load-support frame 18 including left and right front-wheel support rails 31, 32 arranged to lie in spaced-apart parallel relation to one another, a left front wheel unit 36 mounted on the left front-wheel support rail 31 for pivotable movement about a left pivot axis 36A, and a right front wheel unit 38 mounted on the right front-wheel support rail 32 for pivotable movement about a right pivot axis 30A that is arranged to lie in spaced-apart parallel relation to the left pivot axis 36A as suggested in FIGS. 3, 4A, and 5-7. Each of the left and right front wheel units 36, 38 may pivot about its pivot axis 36A or 38A between a folded storage position shown in FIG. 1A and an unfolded rolling position shown in FIGS. 1B and 1C. In the folded storage positions, none of the front wheels 21, 22 in the left and right front wheel units 36, 38 are arranged to engage and roll on ground 35 underlying the rolling base 12 as suggested in FIGS. 1A and 4A. However, in the unfolded rolling positions, the front wheels 21, 22 are arranged to engage and roll on the ground 35 underlying the rolling base 12 as suggested in FIGS. 1B and 1C.

Load carrier 10 also includes spring means 46, 56 for normally and yieldably pivoting each front wheel unit 36, 38 about its pivot axis 36A or 38A to assume the folded storage position in which front wheels 21, 22 in the front wheel units 36, 38 disengage ground 35 underlying the rolling base 12 and the front wheel 21 in the left front wheel unit 36 is arranged to extend toward the front wheel 22 in the right front wheel unit 38 as suggested in FIGS. 4A-4C and 5-7. The spring means 46, 56 illustratively includes a left torsion spring 46 coupled to the left rail 31 and the left front wheel unit 36 and a right torsion spring 36 coupled to the right rail 32 and the right-front wheel unit 38.

Base pusher 14 is formed to include left and right rear wheels 61R, 62R in an illustrative embodiment as suggested in FIGS. 1A-1C, 2, and 3. It is within the scope of this disclosure to include only one rear wheel in base pusher 14.

Base pusher 14 is mounted on the left and right front-wheel support rails 31, 32 of the rolling base 12 for pivotable movement about a base-pusher pivot axis 14A in a first direction from a stored position arranged to lie alongside the left and right front-wheel support rails 31, 32 on top of the rolling base 12 in a flat storage mode of the load carrier 10 (see FIG. 1A) first through about a 90° angle away from the left and right front-wheel support rails 31, 32 to reach an upright cart position to establish a front-and-rear-wheel cart mode of load carrier 10 (see FIG. 1B) in which the two rear wheels 61R, 62R of the base pusher 14 along with two front wheels 21, 22 in the left and right front wheel units 36, 38 roll on ground 35 underlying the load carrier 10. Then the base pusher 14 can be pivoted about the base-pusher pivot axis 14A in the same direction through about another 90° angle to reach a laidback hand-truck position in which only the two front wheels 21, 22 in the left and right front wheel units 36, 38 roll on ground 35 underlying load carrier 10 to establish a 2-wheel hand-truck mode of the load carrier 10 (see FIG. 1C).

Load carrier 10 includes a load-carrier mode changer 16 coupled to the rolling base 12 and to the base pusher 14 as suggested in FIGS. 1A-1C, 2, and 3. The load-carrier mode changer 16 is configured to provide means for pivoting the spring-biased left and right front wheel units 36, 38 about their pivot axes 36A or 38A to move relative to the left and right front-wheel support rails 31, 32 from the folded storage positions shown in FIGS. 1A, 5, and 5A to assume unfolded rolling positions shown in FIGS. 1B, 7, and 7A in which the front wheels 21, 22 included in the left and right front wheel units 36, 38 are arranged to engage and roll on ground 35 underlying the rolling base 12 and rotate about a common axis of rotation in response to pivoting movement of the base pusher 14 relative to the rolling base 12 about the base-pusher pivot axis 14A by a user in the field and cooperate with the rear wheels 61R, 62R included in the base pusher 14 to establish the front-and-rear-wheel cart mode of the load carrier 10.

Load-carrier mode changer 16 includes a front linkage 70 coupled to the pivotable left and right front wheel units 36, 38 and a rear linkage 72 coupled to the pivotable base pusher 14 as suggested in FIGS. 2, 3, 4A, and 5. The rear linkage 72 is always joined to the front linkage 72 to cooperate therewith to cause the pivotable left and right front wheel units 36, 38 to pivot against biasing forces provided by the spring means 46, 56 from the folded storage positions to the unfolded rolling positions in response to pivoting movement of the base pusher 14 about the base-pusher pivot axis 14A in a direction away from the front wheel units 36, 38.

In illustrative embodiments, the front linkage 70 includes a slidable spreader driver 80 mounted for sliding movement on the front-wheel support rails 31, 32 of the rolling base 12 and a wheel spreader 74 coupled to the spreader driver 80 and to the left and right front wheel units 36, 38 as suggested diagrammatically in FIG. 4A and illustratively in FIGS. 2, 3. The rear linkage 72 includes a pivotable pusher rotator 86 mounted for movement on the spreader driver 80 between a FIRST POSITION and SECOND POSITION and a push rod 86P comprising pusher links 113, 114 coupled to the pivotable pusher rotator 86 and to the pivotable base pusher 14. Normally, the pivotable pusher rotator 86 is retained in the FIRST POSITION on the spreader driver 80 to cause the front wheel units 36, 38 to pivot on the rails 31, 32 from their folded storage positions to their unfolded rolling positions in response to pivoting of the base pusher 14 about the base-pusher pivot axis 144 in a direction away from the front wheel units 36, 38 so as to convert the load carrier 10 from the flat storage mode to the front-and-rear-wheel cart mode. At the option of a user, the load carrier 10 is converted from the front-and-rear-wheel cart mode to the 2-wheel hand-truck mode by moving the pivotable pusher rotator 86 on the spreader driver 80 from the FIRST POSITION to the SECOND POSITION to move the push rod 86P relative to the rolling base 12 to pivot the base pusher 14 about the base-pusher pivot axis 14A through an angle of about 90° from the upright cart position to the laidback hand-truck position.

Load carrier 10 is convertible by a user in the field without tools to assume a flat storage mode, a cart mode, and a 2-wheel hand-truck mode as shown in FIGS. 1A-1C. In the flat storage mode shown in FIG. 1A, a pair of front wheels 21, 22 included in a rolling base 12 are in a folded storage position and a base pusher 14 is in a stored position extending along a load-support frame 18 of the rolling base 12 so that load carrier 10 is generally flattened for storage. In the cart mode shown in FIG. 1B, front wheels 21, 22 are moved to an unfolded rolling position and base pusher 14 is moved to an upright cart position extending generally perpendicular to load-support frame 18 of rolling base 12 so that load carrier 10 provides a 2-wheeled hand truck for transporting goods. In the 2-wheel hand-truck mode shown in FIG. 1C, front wheels 21, 22 remain in the unfolded rolling position and base pusher 14 is moved to a laidback hand-truck position extending generally parallel to frame 18 of rolling base 12 so that load carrier 10 provides a two-wheeled stand-up dolly for transporting goods.

In the illustrative embodiment, load carrier 10 includes a mode changer 16 coupled to rolling base 12 and to base pusher 14 as shown in FIGS. 1A-1C. Mode changer 16 provides front-wheel mover means for pivoting front wheels 21, 22 from the folded storage position to the unfolded rolling position in response to movement of base pusher 14 from the stored position to the upright cart position as shown in FIGS. 5-7A, 10, and 11. Mode changer 16 provides pusher-retainer means for holding base pusher 14 in either the upright cart position or in the laidback hand-truck position relative to load-support frame 18 as shown in FIGS. 7-8A and 14-17.

Load carrier 10 illustratively includes rolling base 12, base pusher 14 coupled to rolling base 12, and load-carrier mode changer 16 as shown, for example, in FIGS. 1A-1C. Rolling base 12 is adapted for supporting goods to be transported by load carrier 10. Base pusher 14 is coupled to load-support frame 18 included in rolling base 12 near a first end 17 of load-support frame 18 for movement relative to rolling base 12 about a base-pusher pivot axis 14A and is adapted to provide a grip for a user during use of load carrier 10. Load-carrier mode changer 16 is coupled to rolling base 12 and to base pusher 14 and facilitates reconfiguration of load carrier 10 between modes by moving front wheels 21, 22 included in rolling base 12 and by holding base pusher 14 in predetermined positions relative to rolling base 12.

Rolling base 12 includes a load-support frame 18 and a toe-plate shelf 24 coupled to load-support frame 18 near second end 19 of load-support frame 18 for movement about a shelf pivot axis 24A. Toe-plate shelf 24 moves about shelf pivot axis 24A from an inactive flattened position, shown in FIGS. 7 and 7A, to an active extended position shown in FIGS. 12 and 12A.

Load-support frame 18 includes a left rail 31, a right rail 32 spaced apart from and arranged to extend parallel to left rail 31, a left end cap 33 sized to receive and to be coupled to left rail 31, and a right end cap 34 sized to receive and to be coupled to right rail 32 as shown in FIGS. 2 and 3. Left front wheel 21 is coupled to left rail 31 for movement about left wheel axis 36A which extends along left rail 31. Right front wheel 22 is coupled to right rail 32 for movement about right wheel axis 38A which extends along right rail 32 so that right wheel axis 38A is spaced apart from and arranged to extend parallel to left wheel axis 36A. Toe-plate shelf 24 is coupled to left and right end caps 33, 34 of load-support frame 18 for movement about shelf pivot axis 24A.

Left front wheel unit 36 is coupled to left rail 31 of load-support frame 18 and a right front wheel unit 38 is coupled to right rail 32 of load-support frame 18 as shown in FIG. 4. Left front wheel unit 36 includes left front wheel 21 and couples left front wheel 21 to left rail 31 of load-support frame 18 for movement about left wheel axis 36A. Right front wheel unit 38 includes right front wheel 22 and couples right front wheel 22 to right rail 32 of load-support frame 18 for movement about right wheel axis 38A. Front wheels 21, 22 move about wheel axes 36A, 38A from the folded storage positions, shown in FIGS. 5 and 5A, to the unfolded rolling positions shown in FIGS. 7 and 7A. Movement of front wheels 21, 22 is independent of movement of toe-plate shelf 24.

In the folded storage positions, front wheels 21, 22 are arranged to extend inwardly toward one another to cause load carrier 10 to be flattened as shown in FIGS. 1A and 5. More specifically, left front wheel 21 is arranged to extend from left rail 31 toward right front wheel 22 and right rail 32 of load-support frame 18 when in the folded storage position. Correspondingly, right front wheel 22 is arranged to extend from right rail 32 toward left front wheel 21 and left rail 31 of load-support frame 18 when in the folded storage position.

In the unfolded rolling position, front wheels 21, 22 are arranged to extend downwardly to engage a floor 35 underlying load carrier 10 as shown in FIGS. 1B, 1C, 7, and 14. More specifically, left front wheel 21 and right front wheel 22 are arranged to extend in the same downward direction away from load-support frame 18 when in the unfolded rolling position.

Left front wheel unit 36 includes a brace bracket 42 coupled left rail 31, a wheel support 44 coupled to left rail 31 for movement about left wheel axis 36A, and a left front wheel 21 coupled to wheel support 44 as suggested in FIG. 2. A wheel-bias spring 46 is coupled to left rail 31 and to wheel support 44. Wheel support 44 includes a rail receiver 47, a fork 48, and a cam block 49 as shown in FIGS. 2 and 3. Wheel-bias spring 46 is arranged to extend around a portion of left rail 31 and to engage brace bracket 42 and wheel support 44 to bias wheel support 44, along with left front wheel 21, toward the folded storage position as shown in FIGS. 1A, 5, and 5A.

Wheel support 44 of left front wheel unit 36 is illustratively a monolithic component formed to include a rail receiver 47, a fork 48, a cam block 49, and a hook 41 as shown in FIGS. 2 and 3. Rail receiver 47 is coupled to left rail 31. Fork 48 is coupled to rail receiver 47 and is configured to support left front wheel 21 for rotation relative to wheel support 44. Cam block 49 is coupled to fork 48 and interacts with spreader plate 74P of wheel spreader 74 of front linkage 70 of load-carrier mode changer 16 when left front wheel 21 is moved from the folded storage position to the unfolded rolling position. Hook 41 extends from cam block 49 and is configured to receive base pusher 14 when base pusher 14 is in the stored position as shown in FIGS. 1A and 5 so that base pusher 14 is held in place relative to rolling base 12.

Right front wheel unit 38 is similar to left front wheel unit 36 and includes a brace bracket 52 coupled right rail 32, a wheel support 54 coupled to right rail 32 for movement about right wheel axis 38A, and a right front wheel 22 coupled to wheel support 54. A wheel-bias spring 56 is coupled to right rail 32 and to wheel support 54. Wheel-bias spring 56 is arranged to extend around a portion of right rail 32 and to engage brace bracket 52 and wheel support 54 to bias wheel support 54, along with right front wheel 22, toward the folded storage position as shown in FIGS. 1A, 5, and 5A.

Wheel support 54 of right front wheel unit 38 illustratively is a monolithic component formed to include a rail receiver 57, a fork 58, a cam block 59, and a hook 51 as shown in FIGS. 2 and 3. Rail receiver 57 is coupled to right rail 32. Fork 58 is coupled to rail receiver 57 and is configured to support right front wheel 22 for rotation relative to wheel support 54. Cam block 59 is coupled to fork 58 and interacts with spreader plate 74P of wheel spreader 74 of load-carrier mode changer 16 when right front wheel 22 is moved from the folded storage position to the unfolded rolling position. Hook 51 extends from cam block 59 and is configured to receive base pusher 14 when base pusher 14 is in the collapsed storage position as shown in FIGS. 1A and 5 so that base pusher 14 is held in place relative to rolling base 12.

Base pusher 14 illustratively includes a push handle 55 and an outrigger wheel unit 60 as shown, for example, in FIG. 4. Push handle 55 is coupled to load-support frame 18 of rolling base 12 for movement about base-pusher pivot axis 14A. Outrigger wheel unit 60 is coupled to push handle 55 for movement with push handle 55 about base-pusher pivot axis 14A and illustratively includes a left caster 61, a right caster 62, and a caster-support rail 64 arranged to interconnect left caster 61 and right caster 62. Base pusher 14 pivots about base-pusher pivot axis 14A from the stored position, shown in FIG. 5, to the upright cart position, shown in FIG. 7, and to the laidback hand-truck position shown in FIG. 14.

In the stored position shown in FIGS. 1A and 5, base pusher 14 is arranged to extend along load-support frame 18 of the rolling base 12 to cause load carrier 10 to be generally flattened for storage. More specifically, push handle 55 of base pusher 14 is arranged to extend over a portion of load-support frame 18 when base pusher 14 is in the stored position. Outrigger wheel unit 60 is arranged to lie generally outward of first end 17 of load-support frame 18 to cause left and right casters 61, 62 to lie in a plane defined by load-support frame 18 when base pusher 14 is in the stored position as shown in FIG. 5A.

In the upright cart position shown in FIGS. 2 and 7, base pusher 14 is arranged to extend generally perpendicular to load-support frame 18 of rolling base 12 to cause load carrier 10 to provide a four-wheeled cart for transporting goods as shown in FIGS. 1B and 7. Push handle 55 is arranged to extend upwardly from load-support frame 18 away from an underlying floor 35 when base pusher 14 is in the upright cart position. Outrigger wheel unit 60 is arranged to extend downwardly from load-support frame 18 to cause left and right casters 61, 62 to engage an underlying floor 35 when base pusher 14 is in the upright cart position.

In the laidback hand-truck position show in FIGS. 1C and 14, base pusher 14 is arranged to extend generally parallel to load-support frame 18 of rolling base 12 to cause load carrier 10 to provide a two-wheeled stand-up dolly for transporting goods as shown in FIGS. 1C and 14. Push handle 55 is arranged to extend generally parallel to and away from first end 17 of load-support frame 18 when base pusher 14 is in the laidback hand-truck position. Outrigger wheel unit 60 is arranged to extend generally parallel to and toward second end 19 of load-support frame 18 when base pusher 14 is in the laidback hand-truck position.

Load-carrier mode changer 16 illustratively includes a front linkage 70 and a rear linkage 72 as shown in FIGS. 2 and 3. Front linkage 70 is configured to move front wheels 21, 22 from the folded storage position to the unfolded rolling position in response to movement of base pusher 14 from the stored position to the upright cart position as shown in FIGS. 5-7A, 10, and 11. Rear linkage 72 is configured to hold base pusher 14 in either the upright cart position or in the laidback hand-truck position relative to load-support frame 18 as shown in FIGS. 7-8A and 14-17.

Front linkage 70 illustratively includes a wheel spreader 74 comprising a spreader plate 74P and wheel links 75, 76, and a slidable spreader driver 80 as shown in FIGS. 2 and 3. Spreader plate 74P of wheel spreader 74 is configured to engage cam blocks 49, 59 of left and right front wheel units 36, 38 to push units 36, 38 and front wheels 21, 22 in those units 36, 38 from the folded storage position to the unfolded rolling position as shown in FIGS. 10 and 11. Spreader plate 74P of wheel spreader 74 is received in LOCK (channel) sections 493, 593 formed in hooks 41, 51 attached to corresponding front wheels 21, 22 when front wheels 21, 22 are moved to the unfolded-rolling position to hold the front wheels 21, 22 in the unfolded-rolling position and to brace the front wheels 21, 22 during use of the load carrier 10. Wheel links 75, 76 are pivotably coupled to spreader plate 74P to pivot relative to spreader plate 74P and to slidable spreader driver 80 to pivot relative to slidable spreader driver 80. Slidable spreader driver 80 is coupled to load-support frame 18 to slide along load-support frame 18.

Figure 12:
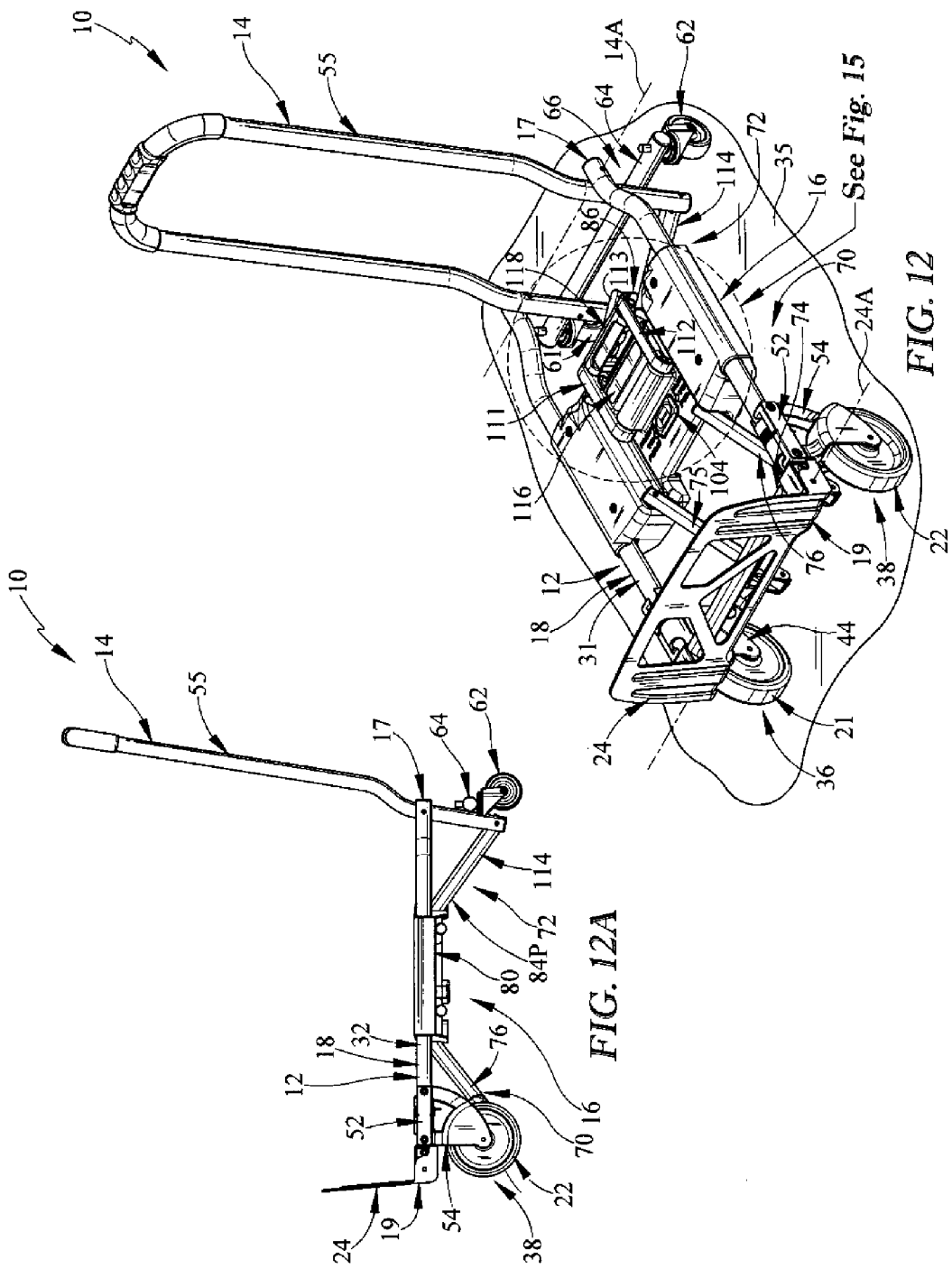
Figures 13, 13A:
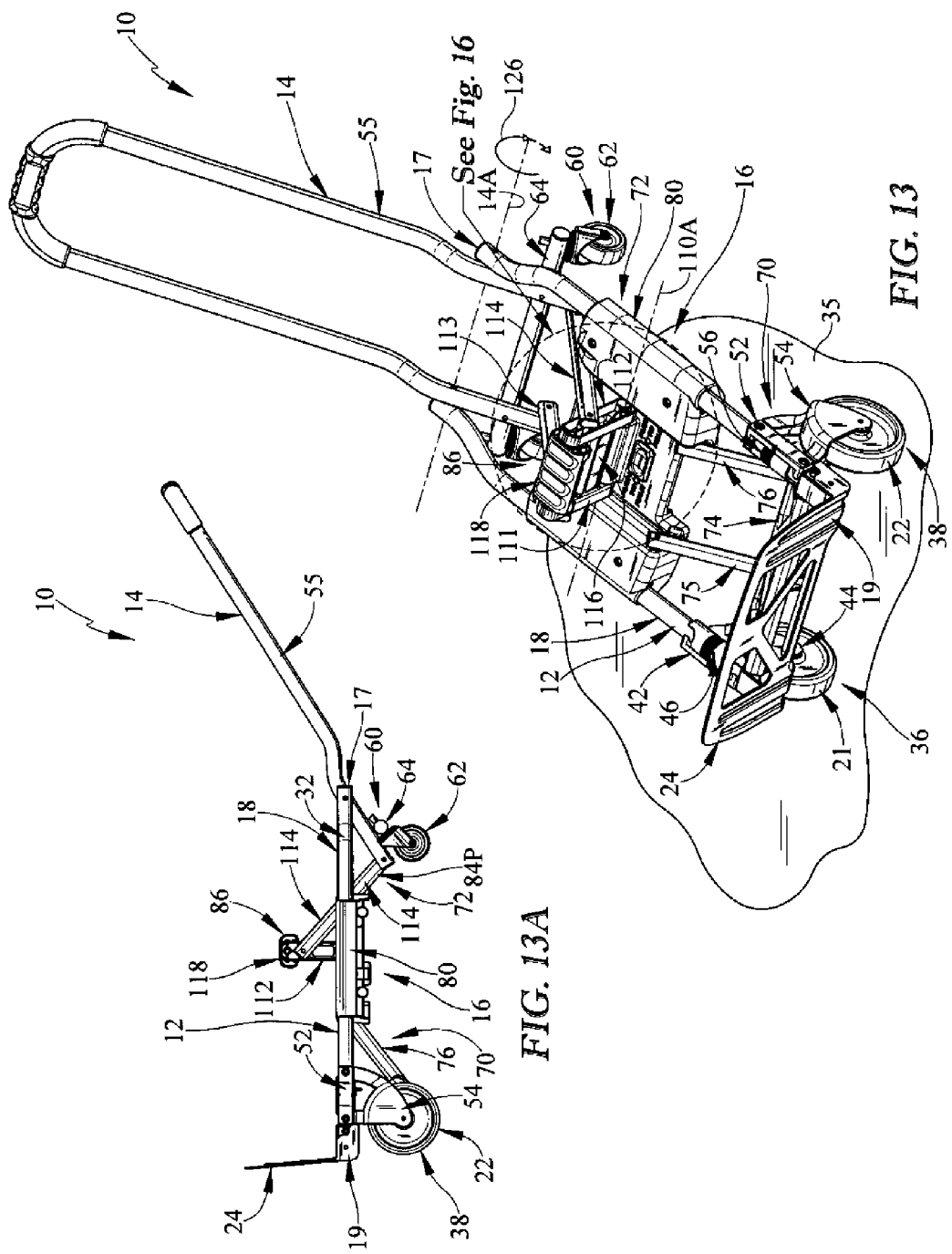

Rear linkage 72 includes a spreader-driver retainer 82, pivotable pusher rotator 86, and push rod 86P, as shown, for example, in FIGS. 2 and 3. Slidable spreader driver 80 is coupled to load-support frame 18 to slide relative to load-support frame 18 and to base pusher 14 through rear linkage 72. Slidable spreader driver 80 facilitates movement of base pusher 14 from the stored position to the upright cart position as shown in FIGS. 5-7. Spreader-driver retainer 82 is configured to block or allow movement of slidable spreader driver 80 along load-support frame 18. Rear linkage 72 is coupled to slidable spreader driver 80 and to base pusher 14 to interconnect slidable spreader driver 80 and base pusher 14. Rear linkage 72 facilitates movement of base pusher 14 relative to slidable spreader driver 80 and load-support frame 18 from the upright cart position to the laidback hand-truck position as shown in FIGS. 12-14.

Figure 8A:
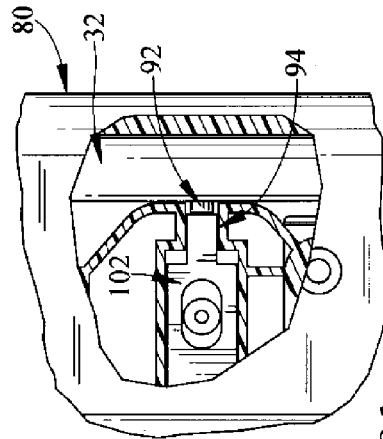
FIG. 8A is a detailed top plan view of a portion of FIG. 8 showing that the slider-retainer pins are received in apertures formed in the slidable spreader driver to hold the slidable spreader driver in place relative to the load-support frame.
Figure 8:
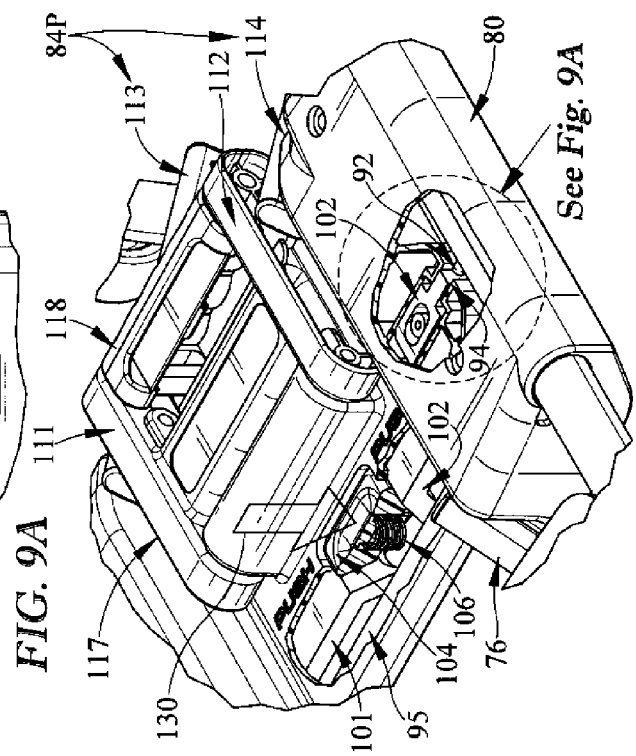
FIG. 8 is a detail perspective view of a portion of the load carrier of FIG. 7 broken away to show that the spreader driver retainer includes a pair of slider-retainer pins coupled to the load-support frame that hold the slidable spreader driver in place along the load-support frame when the base pusher reaches the upright cart position and a pin release coupled to the slidable spreader driver for pushing the slider-retainer pins out of engagement with the slidable spreader driver when the base pusher is collapsed from the upright cart position to the stored position.

Spreader-driver retainer 82 illustratively includes a left spring pin 91, a right spring pin 92, and a pin release 95 as shown in FIGS. 2 and 3. Left spring pin 91 is coupled to left rail 31 of load-support frame 18 and right spring pin 92 is coupled to right rail 32 of load-support frame 18. Left and right spring pins 91, 92 extend into corresponding left and right pin receivers 93, 94 formed in slidable spreader driver 80 when base pusher 14 is moved to the upright cart position from the stored position as shown in FIGS. 7, 8, and 8A. When spring pins 91, 92 are received in pin receivers 93, 94, slidable spreader driver 80 is blocked from movement along load-support frame 18. Pin release 95 is configured to push pins 91, 92 out of pin receivers 93, 94 when a user is ready to move base pusher 14 back from the upright cart position to the stored position.

Figure 9A:
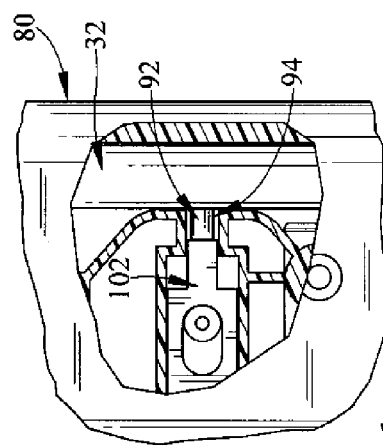
FIG. 9A is a detailed top plan view of a portion of FIG. 9 showing that the pin release includes pin pushers that push the slider-retainer pins out of the apertures formed in the slidable spreader driver when the slider-release button is pressed by a user.
Figure 9:
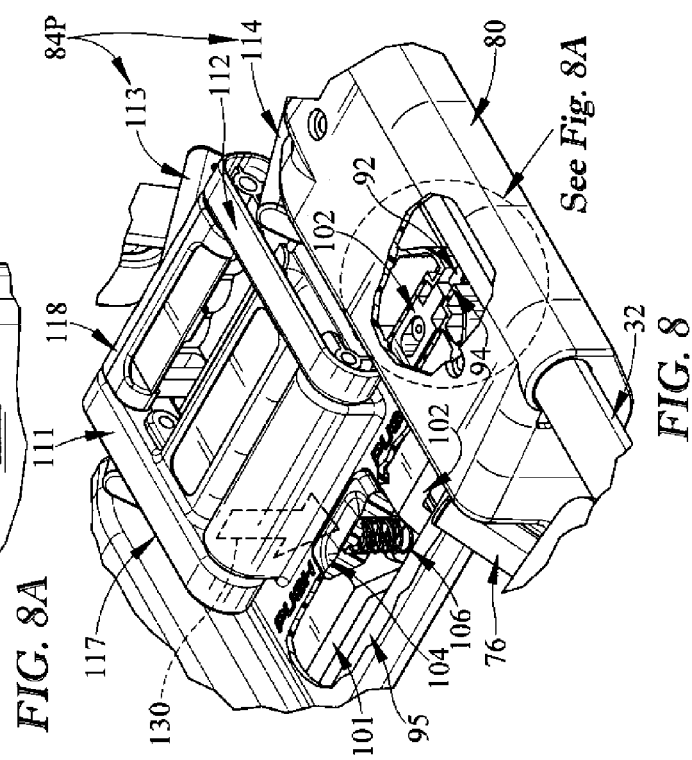
FIG. 9 is a view similar to FIG. 8 showing a user pressing a slider-release button included in the pin release of the spreader driver retainer so that the slidable spreader driver is free to move relative to the load-support frame when the base pusher is collapsed from the upright cart position to the stored position.

Pin release 95 illustratively includes left and right pin pushers 101, 102, a button 104, and a bias spring 106 as shown in FIG. 4. Left and right pin pushers 101, 102 are mounted to slidable spreader driver 80 to slide outwardly in response to a user pressing button 104 to cause pins 91, 92 to be pushed out of pin receivers 93, 94 formed in slidable spreader driver 80 as shown, for example in FIGS. 8 and 9. Button 104 is coupled to slidable spreader driver 80 for movement relative to slidable spreader driver 80 from a disengaged position allowing left and right pin pushers 101, 102 to be moved inwardly by pins 91, 92 to an engaged position pushing left and right pin pusher 101, 102 outwardly. Bias spring 106 is arranged to lie between slidable spreader driver 80 and button 104 to bias button 104 to the disengaged position.

Rear linkage 72 includes slider links 111, 112 and pusher links 113, 114 as shown in FIGS. 2 and 3. Slider links 111, 112 are coupled to slidable spreader driver 80 to pivot relative to slidable spreader driver 80. Pusher links 113, 114 are pivotably coupled to both a corresponding slider link 111, 112 and base pusher 14 to pivot relative to both the corresponding slider link 111, 112 and base pusher 14. Pusher rotator 86 of rear linkage 72 moves between a FIRST POSITION when base pusher 14 is in the upright cart position and a SECOND POSITION when base pusher 14 is in the laidback hand-truck position. When the pusher rotator 86 is in the FIRST POSITION, slider links 111, 112 extend from slidable spreader driver 80 toward the base pusher 14 as shown in FIG. 12. When the pusher rotator 86 is in the SECOND POSITION, slider links 111, 112 extend from slidable spreader driver 80 away from the base pusher 14 as shown in FIG. 14.

To move load carrier 10 from flat-storage mode to cart-pusher mode, as shown in FIGS. 5-7, a user pivots base pusher 14 about base-pusher pivot axis 14A from the stored position to the upright cart position in a first direction as suggested by arrow 120 in FIG. 7. In response to movement of base pusher 14, slidable spreader driver 80 is moved along load-support frame 18 in a forward direction as suggested by arrow 125 until spreader-driver retainer 82 blocks further movement of slidable spreader driver 80 along load-support frame 18 as suggested in FIG. 8. Also, in response to movement of base pusher 14, front wheels 21, 22 are moved about axes 36A, 38A as suggested by arrows 121, 122 to move from the folded storage positions to the unfolded rolling positions as shown in FIG. 7. The user may also move toe-plate shelf 24 to the active extended position from the inactive flat position if it is desired.

To move load carrier 10 from 4-wheel cart mode to 2-wheel hand-truck mode, as shown in FIGS. 12-14, a user moves the pusher rotator 86 from the FIRST POSITION to the SECOND POSITION as suggested by arrow 124 in FIG. 16 to cause base pusher 14 to pivot about base-pusher pivot axis 14A in the first direction from the upright cart position to the laidback hand-truck position as suggested by arrow 126 in FIG. 14. The user may also move toe-plate shelf 24 to the active extended position from the inactive flat position if not already so moved.

To move load carrier 10 from 2-wheel hand-truck mode to the 4-wheel cart mode, a user moves pusher rotator 86 from the SECOND POSITION to the FIRST POSITION. This movement causes base pusher 14 to pivot about pusher axis 14A from the laidback hand-truck position to the upright cart position.

To move load carrier 10 from the 4-wheel cart mode to the flat storage mode, a user first moves the toe-plate shelf 24 to the flat position if it was moved to the extended position previously. Next, the user presses button 104 of slider retainer 82 as suggested by arrow 130 in FIG. 9. In response to the user pressing button 104, pin pushers 101, 102 are moved outward and push spring pins 91, 92 out of slidable spreader driver 80 to free slidable spreader driver 80 to move along load-support frame 18. The user then pivots base pusher 14 about base-pusher pivot axis 14A from the upright cart position to the stored position. As base pusher 14 moves from the upright cart position to the stored position, front-wheel mover 70 allows wheel-bias springs 46, 56 to move front wheels 21, 22 from the unfolded rolling positions to the folded storage positions.

Figure 18A:
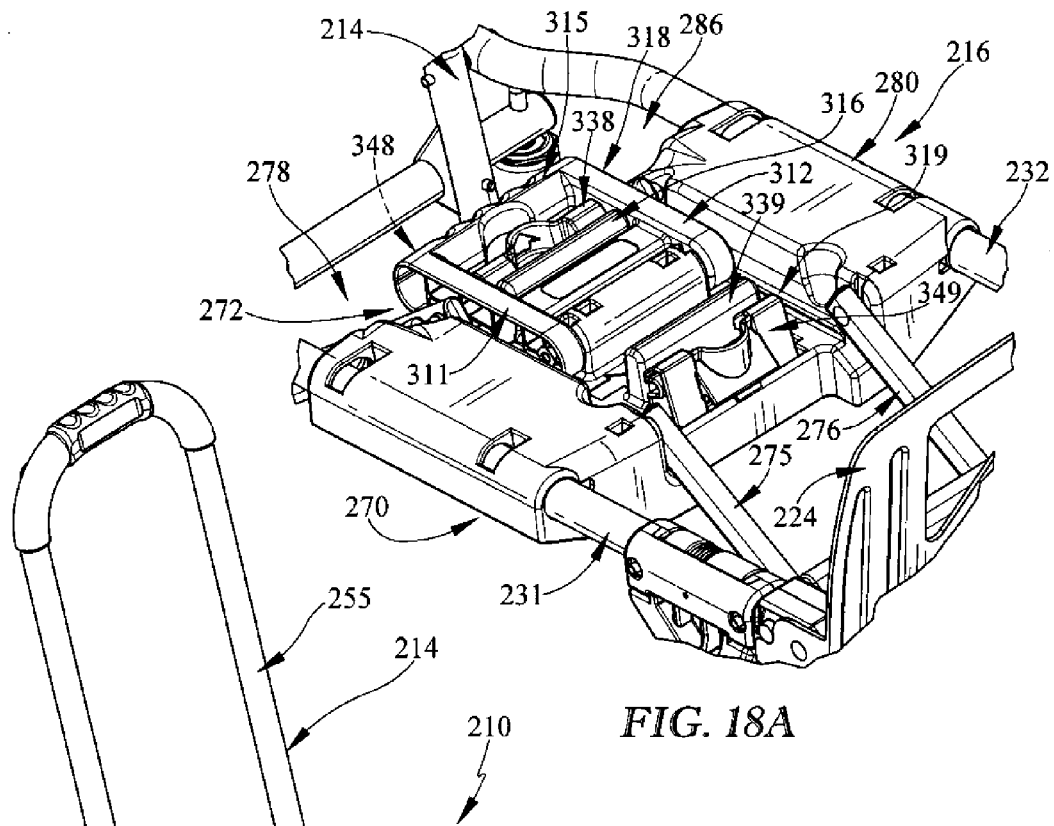
FIG. 18A is a detail view of a portion of the load carrier of FIG. 18 showing that the alternative pusher rotator includes a forward lock and an aft lock each coupled to the slidable spreader driver and adapted to engage a handle coupled to the rear linkage when the base pusher is in one of the upright cart position or the laidback hand-truck position.
Figure 18:
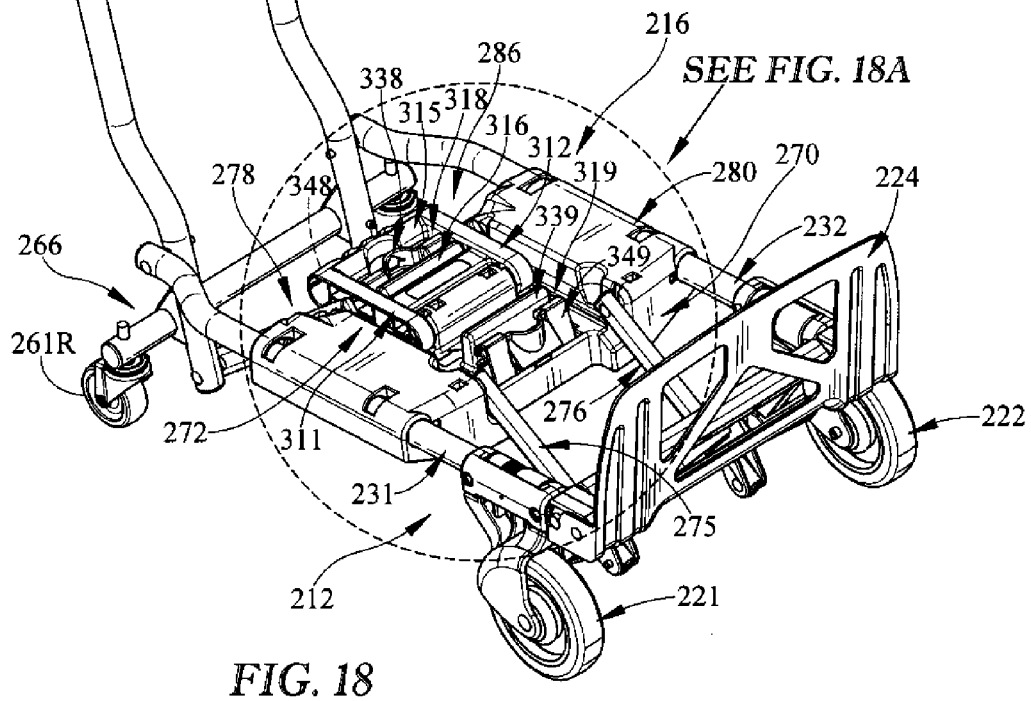
FIG. 18 is a perspective view of another illustrative load carrier similar to the load carrier shown in FIGS. 1-17 that includes an alternative pusher rotator for maintaining the position of the rear linkage thereby to hold the base pusher in either the upright cart position or the laidback hand-truck position.

Another illustrative load carrier 210 is shown in FIGS. 18 and 18A. The load carrier 210 is substantially similar to the load carrier 10 shown in FIGS. 1-17 and described herein. Accordingly, similar reference numbers in the 200/300 series indicate features that are common between the load carrier 210 and the load carrier 10. The description of the load carrier 10 is hereby incorporated by reference to apply to the hand truck 210, except in instances when it conflicts with the specific description and drawings of the hand truck 210.

Unlike load carrier 10, load carrier 210 includes a pusher rotator 286 having forward and aft locks 318, 319 (rather than a single lock 118). Pusher rotator 286 provides means for blocking or allowing movement of the links 213, 214 between a first position, corresponding to the upright cart position of the base pusher 214, and a second position, corresponding to the laidback hand-truck position of the base pusher 214.

Pusher rotator 286 illustratively includes a handle 315, a crossbar 316, forward lock 318, and aft lock 319 as shown in FIGS. 18 and 18A. Handle 315 and crossbar 316 extend between and interconnect slider links 311, 312. Forward lock 318 is coupled to slidable spreader driver 280 along a side of slidable spreader driver 280 facing base pusher 214. Aft lock 319 is coupled to slidable spreader driver 280 along another side of slidable spreader driver 280 facing toe-plate shelf 224. Forward lock 318 is configured to engage handle 315 when links 213, 214 are in a first position. Aft lock 319 is configured to engage handle 315 when shifter linkage 278 is in a second position.

Each lock 318, 319 includes a corresponding wall 338, 339 and a corresponding blocker 348, 349 as shown, for example, in FIG. 18A. Handle 315 is received between a wall 338, 339 and a blocker 348, 349 when handle 315 is engaged by a lock 318, 319. Blockers 348, 349 pivot relative to slidable spreader driver 280 to block or allow movement of handle 315 and, in turn, movement of links 213, 214. Blockers 348, 349 are biased toward blocking movement of handle 315 and links 213, 214 by a bias spring (not shown).

The invention claimed is:

1. A collapsible load carrier comprising
a rolling base including a load-support frame, a left front wheel unit mounted for pivotable movement on the load-support frame about a left pivot axis between a folded storage position and an unfolded rolling position, a right front wheel unit mounted for pivotable movement on the load-support frame about a right pivot axis between a folded storage position associated with a flat storage mode of the load carrier in which front wheels in the front wheel units disengage ground underlying the rolling base and a front wheel in the left front wheel unit is arranged to extend toward a front wheel in the right front wheel unit and an unfolded rolling position associated with a front-and-rear-wheel cart mode of the load carrier in which the front wheels in the front wheel units are arranged to engage and roll on ground underlying the rolling base and rotate about a common axis of rotation, and a spring yieldably pivoting each front wheel unit about its pivot axis normally to assume the folded storage position,
a base pusher mounted for pivotable movement relative to the load-support frame of the rolling base about a base-pusher pivot axis from a stored position arranged to lie alongside and on top of the load-support frame of the rolling base and associated with the flat storage mode of the load carrier in a first direction to an upright cart position to cause a rear wheel included in the base pusher to engage and roll on ground underlying the rolling base, and
load-carrier mode changer means for pivoting the left and right front wheel units about their pivot axes to move relative to the load-support frame of the rolling base from the folded storage position to the unfolded rolling position to cause front wheels included in the front wheel units to engage and roll on ground underlying the rolling base in response to pivoting movement of the base pusher relative to the load-support frame about the base-pusher pivot axis from the stored position on top of the load-support frame through a first pivot angle to the upright cart position to cause the rear wheel included in the base pusher to engage and roll on ground underlying the rolling base to establish a front-and-rear-wheel cart mode of the load carrier.

2. The load carrier of claim 1, wherein the base pusher is also movable about the base-pusher pivot axis from the stored position in the first direction past the upright cart position to reach a 2-wheel hand-truck position to lie in generally coplanar relation to the top of the load-support frame of the rolling base to define an included angle of about 180° therebetween to establish a 2-wheel hand-truck mode of the load carrier in which the rolling base is supported for rolling movement only on the front wheels upon movement of the rolling base and the base pusher as a unit to disengage any rear wheel in the base pusher from the ground underlying the rolling base.

3. The load carrier of claim 2, wherein the load-carrier mode changer means includes a front linkage coupled to the left and right front wheel units and mounted for sliding movement on the load-support frame of the rolling base and a rear linkage coupled to the base pusher and mounted for movement relative to the front linkage between a first position on the front linkage associated with the flat storage mode and the front-and-rear-wheel cart mode of the load carrier and a second position located on the front linkage between the first position and the front wheel units and associated with the 2-wheel hand-truck mode of the load carrier and the base pusher is configured to pivot about the base-pusher pivot axis in the first direction from the upright cart position to the 2-wheel hand-truck position while the front linkage remains in a stationary position on the load-support frame of the rolling base during movement of the rear linkage relative to the front linkage from the first position to the second position to establish the 2-wheel hand-truck mode of the load carrier.

4. The load carrier of claim 3, wherein the front linkage includes a slidable spreader driver mounted for sliding movement on the load-support frame and a wheel spreader coupled to the slidable spreader driver and arranged to engage a cam provided on each of the left and right front wheel units to move the left and right front wheel units against motion-resisting forces applied to the left and right front wheel units by the spring from the folded storage positions to the unfolded rolling positions in response to movement of the base pusher about the base-pusher pivot axis in the first direction to move, in unison, the rear linkage, the slidable spreader driver, and the wheel spreader as a unit toward the front wheels so that the left and right front wheel units are spread apart to cause the front wheels in the left and right front wheel units to rotate about a common axis and on ground underlying the rolling base.

5. The load carrier of claim 4, wherein the rear linkage includes a pusher rotator mounted for movement on the slidable spreader driver of the front linkage between the first and second positions and a push rod coupled to the pusher rotator and to the base pusher to cooperate with the pusher rotator while the pusher rotator remains in the first position to convert pivoting motion of the base pusher about the base-pusher pivot axis into sliding motion of the slidable spreader driver on the load-support frame in a direction toward the front wheels to urge the wheel spreader into camming engagement with the left and right front wheel units to move those wheel units from their folded storage positions to their unfolded rolling positions.

6. The load carrier of claim 1, wherein the load-carrier mode changer means includes a slidable spreader driver mounted for sliding movement on the load-support frame and a wheel spreader coupled to the spreader driver and arranged to engage a cam provided on each of the left and front wheel units and wherein the left and right front wheel units move from the folded storage positions to the unfolded rolling positions during camming engagement with the wheel spreader in response to sliding motion of the slidable spreader driver on the load-support frame toward the front wheels to cause the wheel spreader to move away from the base-pusher pivot axis.

7. The load carrier of claim 6, wherein the wheel spreader includes a proximal portion mounted on the load-support frame for pivotable movement about a spreader-pivot axis and a free portion arranged to pivot about the spreader-pivot axis and engage the cam provided on each of the left and right front wheel units.

8. The load carrier of claim 7, wherein the wheel spreader includes a spreader plate mounted for pivotable movement on the rolling base and a wheel link pivotably coupled to each of the spreader plate and the slidable spreader driver to convert sliding motion of the slidable spreader driver into pivoting motion of spreader plate and wherein the pivoting spreader plate applies a pivot-inducing force to cams included in the left and right front wheel units to pivot the left and right front wheel units from the folded storage positions to the unfolded rolling positions in response to pivoting movement of the base pusher in the first direction about the base-pusher pivot axis to change the load carrier from the flat storage mode to the front-and-rear-wheel cart mode.

9. The load carrier of claim 1, wherein the load-carrier mode changer includes a front linkage coupled to the left and right front wheel units and a rear linkage coupled to the base pusher and mounted for movement on the front linkage between a first position associated with the flat storage mode and the front-and-rear-wheel cart mode of the load carrier and a second position associated with a 2-wheel hand-truck mode of the load carrier, the front and rear linkages cooperate to provide means for pivoting the left and right front wheel units from the folded storage positions to the unfolded rolling positions only when the rear linkage occupies the first position on the front linkage, and the base pusher is arranged to pivot about the base-pusher pivot axis through a second pivot angle in a direction away from the front wheel units to move relative to the load-support frame of the rolling base from the upright cart position to a laidback hand-truck position to establish a 2-wheel hand-truck mode of the load carrier in response to movement of the rear linkage relative to the front linkage from the first position to the second position.

10. The load carrier of claim 9, wherein the front linkage includes a slidable spreader driver mounted for sliding movement on the load-support frame and a wheel spreader coupled to the slidable spreader driver and arranged to lie in camming engagement with the left and right front wheel units and the rear linkage includes a pusher rotator mounted for movement on the slidable spreader driver between the first and second positions and a push rod coupled to the pusher rotator and to the base pusher.

11. The load carrier of claim 10, wherein the wheel spreader includes a spreader plate mounted for pivotable movement on the rolling base and a wheel link pivotably coupled to each of the spreader plate and the slidable spreader driver to convert sliding motion of the slidable spreader driver into pivoting motion of spreader plate and wherein the pivoting spreader plate applies a pivot-inducing force to cams included in the left and right front wheel units to pivot the left and right front wheel units from the folded storage positions to the unfolded rolling positions in response to pivoting movement of the base pusher in the first direction about the base-pusher pivot axis to change the load carrier from the flat storage mode to the front-and-rear-wheel cart mode.

12. The load carrier of claim 8, wherein the load-support frame and the base pusher cooperate to define therebetween an included angle of about 90° upon movement of the base pusher to the upright cart position and the load-support frame and the base pusher cooperate to define therebetween an included angle of about 180° upon movement of the base pusher to the laidback hand-truck position.

13. The load carrier of claim 8, wherein each of the first and second pivot angles is about 90°.

14. A collapsible load carrier comprising
a rolling base including a load-support frame, a left front wheel unit mounted for pivotable movement on the load-support frame about a left pivot axis between a folded storage position and an unfolded rolling position, a right front wheel unit mounted for pivotable movement on the load-support frame about a right pivot axis between a folded storage position associated with a flat storage mode of the load carrier in which front wheels in the front wheel units disengage ground underlying the rolling base and a front wheel in the left front wheel unit is arranged to extend toward a front wheel in the right front wheel unit and an unfolded rolling position associated with a front-and-rear-wheel cart mode of the load carrier in which the front wheels in the front wheel units are arranged to engage and roll on ground underlying the rolling base and rotate about a common axis of rotation, and a spring yieldably pivoting each front wheel unit about its pivot axis normally to assume the folded storage position,
a base pusher mounted for pivotable movement relative to the load-support frame of the rolling base about a base-pusher pivot axis from a stored position arranged to lie alongside and on top of the load-support frame of the rolling base and associated with the flat storage mode of the load carrier in a first direction to an upright cart position to cause a rear wheel included in the base pusher to engage and roll on ground underlying the rolling base, and a load-carrier mode changer including a front linkage mounted for sliding movement on the load-support frame and arranged to engage each of the front wheel units in camming relation and a rear linkage coupled to each of the front linkage and the base pusher and arranged to cooperate with the front linkage to apply a camming force to each of the front wheel units in response to pivoting movement of the base pusher about the base-pusher pivot axis in the first direction when the load carrier is in the flat storage mode to move each of the front wheel units from the folded storage position to the unfolded rolling position to establish the front-and-rear-wheel cart mode of the load carrier.

15. The load carrier of claim 14, wherein the front linkage includes a slidable spreader driver mounted for sliding movement on the load-support frame and a wheel spreader coupled to the slidable spreader driver to lie between the slidable spreader driver and the front wheels and arranged to lie in camming engagement with the front wheel units.

16. The load carrier of claim 15, wherein the wheel spreader includes a spreader plate mounted for pivotable movement on the rolling base and a wheel link pivotably coupled to each of the spreader plate and the slidable spreader driver to convert sliding motion of the slidable spreader driver into pivoting motion of spreader plate and wherein the pivoting spreader plate applies a pivot-inducing force to cams included in the left and right front wheel units to pivot the left and right front wheel units from the folded storage positions to the unfolded rolling positions in response to pivoting movement of the base pusher in the first direction about the base-pusher pivot axis to change the load carrier from the flat storage mode to the front-and-rear-wheel cart mode.

17. The load carrier of claim 15, wherein the rear linkage is mounted for movement on the front linkage between a first position associated with the flat storage mode and the front-and-rear-wheel cart mode of the load carrier and a second position associated with the 2-wheel hand-truck mode of the load carrier, the front and rear linkages cooperate to provide means for pivoting the left and right front wheel units from the folded storage positions to the unfolded rolling positions only when the rear linkage occupies the first position on the front linkage, and the base pusher is arranged to pivot about the base-pusher pivot axis in the first direction to move relative to the load-support frame of the rolling base from the upright cart position to a laidback hand-truck position to establish a 2-wheel hand-truck mode of the load carrier n response to movement of the rear linkage relative to the front linkage from the first position to the second position.

18. The load carrier of claim 17, wherein the rear linkage includes a pusher rotator mounted for movement on the front linkage between the first and second positions and a push rod pivotably coupled to each of the pusher rotator and the base pusher.

19. The load carrier of claim 18, wherein the pusher rotator is mounted on the front linkage for pivotable movement about a rotator pivot axis between the first and second positions.

20. The load carrier of claim 17, wherein the front linkage includes a slidable spreader driver mounted for sliding movement on the load-support frame and a wheel spreader coupled to the slidable spreader driver and arranged to lie in camming engagement with the left and right front wheel units and the rear linkage includes a pusher rotator mounted for movement on the slidable spreader driver between the first and second positions and a push rod coupled to the pusher rotator and to the base pusher.

21. The load carrier of claim 1, wherein the base pusher includes a push handle and an outrigger wheel unit coupled to the push handle to move therewith and configured to include the rear wheel.

22. The load carrier of claim 21, wherein each of the left and right front wheels has a first diameter and the rear wheel has a second diameter that is less than the first diameter.

23. The load carrier of claim 22, wherein the second diameter is about half of the first diameter.

24. The load carrier of claim 21, wherein the outrigger wheel unit includes a horizontally extending wheel support coupled to the push handle to move therewith relative to the rolling base during pivotable movement of the base pusher about the base-pusher pivot axis and the rear wheel is coupled to the horizontally extending wheel support to move therewith.

25. The load carrier of claim 21, wherein the outrigger wheel unit includes a first caster including the rear wheel, a second caster including a second rear wheel, and a caster-support rail arranged to interconnect the first and second casters and coupled to the push handle to move therewith.

26. The load carrier of claim 25, wherein the push handle includes a leg mounted on the load-support frame for pivotable movement about the base-pusher pivot axis, the leg includes an upper portion above the base pusher axis and a lower portion below the base-pusher axis, and the caster-support rail is coupled to the lower portion of the leg of the push handle.

27. The load carrier of claim 26, wherein the base pusher is also movable about the base-pusher pivot axis from the stored position in the first direction past the upright cart position to reach a 2-wheel hand-truck position to lie in generally coplanar relation to the top of the load-support frame of the rolling base to define an included angle of about 180° therebetween to establish a 2-wheel hand-truck mode of the load carrier in which the rolling base is supported for rolling movement only on the front wheels upon movement of the rolling base and the base pusher as a unit to disengage any rear wheel in the base pusher from the ground underlying the rolling base and wherein the load-carrier mode changer means includes a front linkage coupled to the left and right front wheel units and mounted for sliding movement on the load-support frame of the rolling base and a rear linkage coupled to the lower portion of the leg of the push handle of the base pusher and mounted for movement relative to the front linkage between a first position on the front linkage associated with the flat storage mode and the front-and-rear-wheel cart mode of the load carrier and a second position located on the front linkage between the first position and the front wheel units and associated with the 2-wheel hand-truck mode of the load carrier and the base pusher is configured to pivot about the base-pusher pivot axis in the first direction from the upright cart position to the 2-wheel hand-truck position while the front linkage remains in a stationary position on the load-support frame of the rolling base during movement of the rear linkage relative to the front linkage from the first position to the second position to establish the 2-wheel hand-truck mode of the load carrier.

* * * * *